(12) United States Patent
Henderson et al.

(10) Patent No.: US 7,133,400 B1
(45) Date of Patent: Nov. 7, 2006

(54) SYSTEM AND METHOD FOR FILTERING DATA

(75) Inventors: Alex E. Henderson, Hillsborough, CA (US); Walter E. Croft, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/240,919

(22) Filed: Jan. 29, 1999

Related U.S. Application Data

(60) Provisional application No. 60/095,825, filed on Aug. 7, 1998.

(51) Int. Cl.
*H04L 12/56* (2006.01)
*H04L 12/54* (2006.01)

(52) U.S. Cl. ..................... 370/389; 370/401; 709/224

(58) Field of Classification Search ............. 370/389, 370/392, 351, 400, 401, 471, 466; 707/1, 707/2, 3–8; 709/238, 242, 245, 246, 230, 709/224
See application file for complete search history.

(56) References Cited

U.S. PATENT DOCUMENTS

| | | | |
|---|---|---|---|
| 3,845,465 A | | 10/1974 | Hosick et al. |
| 4,627,024 A | | 12/1986 | Whalen et al. |
| 4,760,374 A | | 7/1988 | Moller |
| 5,390,173 A | * | 2/1995 | Spinney et al. ............. 370/393 |
| 5,414,704 A | * | 5/1995 | Spinney ..................... 370/389 |
| 5,509,006 A | | 4/1996 | Wilford et al. ............... 370/60 |
| 5,561,429 A | | 10/1996 | Halberstam et al. |
| 5,574,910 A | | 11/1996 | Bialkowski et al. ......... 395/601 |
| 5,608,662 A | | 3/1997 | Large et al. ............ 364/724.01 |
| 5,761,191 A | * | 6/1998 | VanDervort et al. ........ 370/232 |
| 5,761,424 A | * | 6/1998 | Adams et al. .............. 709/217 |
| 5,802,054 A | | 9/1998 | Bellenger .................... 370/401 |
| 5,884,033 A | | 3/1999 | Duvall et al. .......... 395/200.36 |
| 5,917,821 A | * | 6/1999 | Gobuyan et al. ............ 370/392 |
| 5,951,651 A | * | 9/1999 | Lakshman et al. .......... 709/239 |
| 6,181,698 B1 | * | 1/2001 | Hariguchi ................... 370/392 |
| 6,226,710 B1 | * | 5/2001 | Melchior .................... 711/108 |
| 6,266,700 B1 | * | 7/2001 | Baker et al. ................ 709/230 |
| 6,304,903 B1 | * | 10/2001 | Ward .......................... 709/224 |
| 6,434,144 B1 | * | 8/2002 | Romanov ................... 370/392 |
| 6,597,694 B1 | * | 7/2003 | Fondekar et al. ........... 370/389 |
| 6,700,891 B1 | * | 3/2004 | Wong ......................... 370/401 |
| 2002/0010793 A1 | * | 1/2002 | Noll et al. .................. 709/240 |

FOREIGN PATENT DOCUMENTS

WO WO 94/01828 1/1994

* cited by examiner

*Primary Examiner*—Ajit Patel
(74) *Attorney, Agent, or Firm*—Blakely, Sokoloff, Taylor & Zafman LLP

(57) ABSTRACT

A system for filtering data comprises a filtering database for storing layered rule tables and a data filtering engine coupled to the filtering database for filtering the input data using the layered rule tables. The data filtering engine filters or classifies input data using tests or rules performed on the data elements in the input data. The data elements are segments of data in the input data and are selected from the input data using a data element locator. Preferably, each rule table in the filtering database comprises a data element locator, a default rule, and zero or more filtering rules. The filtering rules comprise the tests or rules that are to be applied to the data elements. Each rule table corresponds to a single data element and each filtering rule in the rule table is to be applied to that data element.

29 Claims, 22 Drawing Sheets

MULTI-WAY DECISION TREE AS LINKED RULE TABLES (SEQUENTIAL DATA FILTERING SYSTEM)

MULTI-WAY DECISION TREE AS LINKED RULE TABLES (DATA ELEMENT LOCATOR STRUCTURE)

| | TYPE == FILTERING RULE 502 | |
|---|---|---|
| TYPE FIELD | | |
| RANGE TEST | LOWER BOUND 506 | UPPER BOUND 508 |
| RULE TREE | LEFT POINTER 510 | RIGHT POINTER 512 | BALANCE FACTOR 514 |
| ACTION | INSTRUCTION 516 | USER DATA (TAG) 518 |
| RULE TIMER | TIMER CONTROL 520 | RELOAD VALUE 522 | TIMER VALUE 524 |
| STATISTICS | STATISTICS CONTROL 526 | THRESHOLD 528 | VALUE 530 |

⎯ 304

**FIGURE 5A
(FILTERING RULE)**

| | TYPE == DEFAULT RULE 550 | |
|---|---|---|
| TYPE FIELD | | |
| ACTION | INSTRUCTION 554 | USER DATA (TAG) 556 |
| RULE TIMER | TIMER CONTROL 558 | RELOAD VALUE 560 | TIMER VALUE 562 |
| STATISTICS | STATISTICS CONTROL 564 | THRESHOLD 566 | VALUE 568 |

⎯ 306

**FIGURE 5B
DEFAULT RULE**

(RULE TABLE WITH A BINARY TREE
OF FILTERING RULES)

DATA FILTERING ENGINE (RULE EVALUATOR 710)

(SEQUENTIAL PACKET FILTERING SYSTEM)

APPLICATION OF MULTIPLE EVENT QUEUES (PACKET FORMAT)

MULTI-WAY DECISION TREE AS LINKED RULE TABLES (PROTOCOL ELEMENT LOCATOR STRUCTURE)

192.192.254.3 AN IP HOST ADDRESS (SELECTED PROTOCOL ELEMENT)

FIGURE 13A
(FILTERING RULE)

| TYPE FIELD | TYPE == FILTERING RULE 1302 | |
|---|---|---|
| RANGE TEST | LOWER BOUND 1306 | UPPER BOUND 1308 |
| RULE TREE | LEFT POINTER 1310 | RIGHT POINTER 1312 | BALANCE FACTOR 1314 |
| ACTION | INSTRUCTION 1316 | USER DATA (TAG) 1318 |
| RULE TIMER | TIMER CONTROL 1320 | RELOAD VALUE 1322 | TIMER VALUE 1324 |
| STATISTICS | STATISTICS CONTROL 1326 | THRESHOLD 1328 | VALUE 1330 |

FIGURE 13B
(DEFAULT RULE)

| TYPE FIELD | TYPE == DEFAULT RULE 1350 | |
|---|---|---|
| ACTION | INSTRUCTION 1354 | USER DATA (TAG) 1356 |
| RULE TIMER | TIMER CONTROL 1358 | RELOAD VALUE 1360 | TIMER VALUE 1362 |
| STATISTICS | STATISTICS CONTROL 1364 | THRESHOLD 1366 | VALUE 1368 |

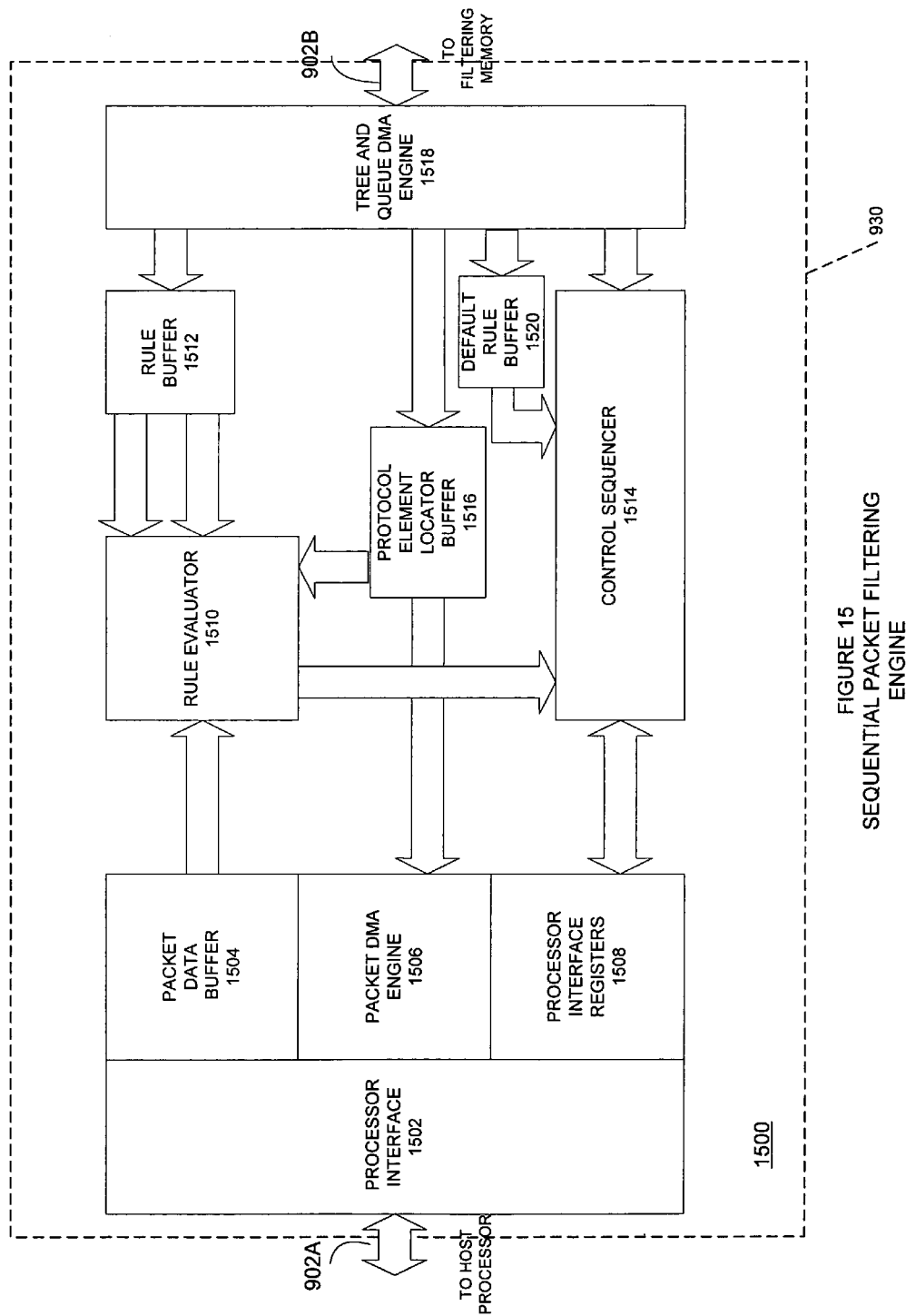

(RULE EVALUATOR)

PARALLEL PACKET FILTERING SYSTEM

SYSTEM AND METHOD FOR FILTERING DATA

RELATED APPLICATION

The subject matter of this application is related to and claims priority from U.S. Provisional Application Ser. No. 60/095,825 entitled "System and Method for Packet Filtering" by Alex E. Henderson and Walter E. Croft, which was filed on Aug. 7, 1998 and which subject matter is incorporated herein by reference in its entirety.

BACKGROUND OF THE INVENTION

1. Field of the Invention

The present invention relates generally to a system and method for filtering data. In particular, the present invention relates to a system and method for filtering data based on layered rule tables and data elements. Still more particularly, the present invention relates to a system and method for filtering packets based on layered rule tables and protocol elements.

2. Description of the Related Art

When data is to be processed by a computing device, a system, such as a data filtering engine, is needed to classify or filter such incoming data. For example, in a computer network, data transferred from one network device to another network device via the computer network are typically broken down into smaller blocks of data called packets. In order for a networking device to process an incoming packet, the device needs to filter or classify the incoming packet so it can determine what action should be taken on the packet. Packet filtering is a basic requirement of networking devices such as routers, upper layer switches, firewalls and bandwidth managers.

One method in the prior art is to provide a switching device with an associative memory such as a Content Addressable Memory (CAM). The initial part of the packet is then compared simultaneously with several different expected packet headers. One disadvantage of this method is that the extra bytes that must be matched in order for routing make it very expensive due to the increased width of the associative memory. Moreover, packets with variable length addresses, such as CLNP, or protocols that have variable length encapsulations, such as IPX, would require all possible combinations to be included in the associative memory thus increasing the cost of the method.

Another method in the prior art is described in U.S. Pat. No. 5,509,006 entitled "Apparatus and Method for Switching Packets Using Tree Memory" (the '006 patent) assigned to Cisco Systems. The '006 patent retrieves a data byte, compares the data byte with a protocol byte, tests the comparison result and executes a processor instruction. One disadvantage with the '006 patent is that it is difficult to implement for protocols with wide fields because it evaluates only one byte at a time. Tests of wide fields such as those used in IPv6 addresses or variable fields must be implemented as several separate tests. This requires larger memories to implement the decision tree used by the '006 patent thereby increasing the cost and decreasing the efficiency of the method.

Therefore, what is needed is a system and method for filtering data that overcomes the disadvantages of the prior art. More specifically, what is needed is a system and method for filtering data that can quickly and inexpensively test the various fields of the data. Still more particularly, what is needed is a system and method for filtering packets that can quickly and inexpensively test the various protocol fields or protocol elements of a packet regardless of the size or location of the protocol elements or the communication protocol used.

SUMMARY OF THE INVENTION

The present invention overcomes the limitations and shortcomings of the prior art with a system and method for filtering data using layered rule tables and data element locators. The present invention advantageously operates upon data elements in a block of input data using the layered rule tables to quickly and efficiently classify or filter the data elements. In one embodiment of the present invention, the input data are packets, and a data element is a protocol element (defined herein) in the packet. In such embodiment, the present invention advantageously allows a device to quickly and efficiently filter packets using the protocol elements and rule tables corresponding to those protocol elements.

A system for filtering data in accordance with the present invention comprises a filtering database for storing layered rule tables and a data filtering engine coupled to the filtering database for filtering the input data using the layered rule tables. The data filtering engine filters or classifies input data using tests or rules performed on the data elements in the input data. The data elements are segments of data in the input data and are selected from the input data using a data element locator. Preferably, each rule table in the filtering database comprises a data element locator, a default rule, and zero or more filtering rules. The filtering rules comprise the tests or rules that are to be applied to the data elements. Each rule table corresponds to a single data element and each filtering rule in the rule table is to be applied to that data element.

In one embodiment of the present invention, the system for filtering data is a system for filtering packets comprising a filtering database for storing layered rule tables and a packet filtering engine coupled to the filtering database for filtering packets using the layered rule tables. The packet filtering engine filters or classifies packets using tests or rules performed on the protocol elements in the packet. Protocol elements are fields in the packet defined by a communication protocol and are selected from the packet using a protocol element locator. Preferably, each rule table in the filtering database comprises a protocol element locator, a default rule, and zero or more filtering rules. The filtering rules comprise the tests or rules that are to be applied to the protocol elements. Each rule table corresponds to a single protocol element and each filtering rule in the rule table is to be applied to that protocol element. In a preferred embodiment, the packet filtering engine comprises a packet data buffer for storing portions of the packets, a rule evaluator for selecting the protocol element from the packet and for applying a filtering rule to the selected protocol element, and a protocol element locator buffer for storing the protocol element locator. The filtering database preferably comprises layered rule tables wherein a single rule table corresponds to a protocol element.

The present invention also comprises a method for filtering packets. A method for filtering packets comprises the steps of: selecting a protocol element from the input data; accessing a rule table in the layered rule tables corresponding to the selected protocol element; and applying the filtering rules in a rule table to the selected protocol element. Preferably, the step of selecting a protocol element further comprises the substeps of obtaining a protocol element locator from the rule table in the filtering database; and applying the protocol element locator to the packet to select the protocol element from the packet.

BRIEF DESCRIPTION OF THE FIGURES

FIGS. 5A and 5B show block diagrams of preferred structures of a filtering rule and default rule respectively in accordance with the present invention.

FIGS. 13A and 13B show block diagrams of preferred embodiments of a filtering rule and a default rule respectively.

FIG. 15 shows a block diagram of a preferred embodiment of a sequential packet filtering engine.

DESCRIPTION OF THE PREFERRED EMBODIMENT

In the following description, for purposes of explanation, specific numbers, materials, and configurations are set forth in order to provide a thorough understanding of the present invention. However, it will be apparent to one skilled in the art that the present invention may be practiced without the specific details. In other instances, well-known features are omitted or simplified in order not to obscure the present invention.

Figure 1:
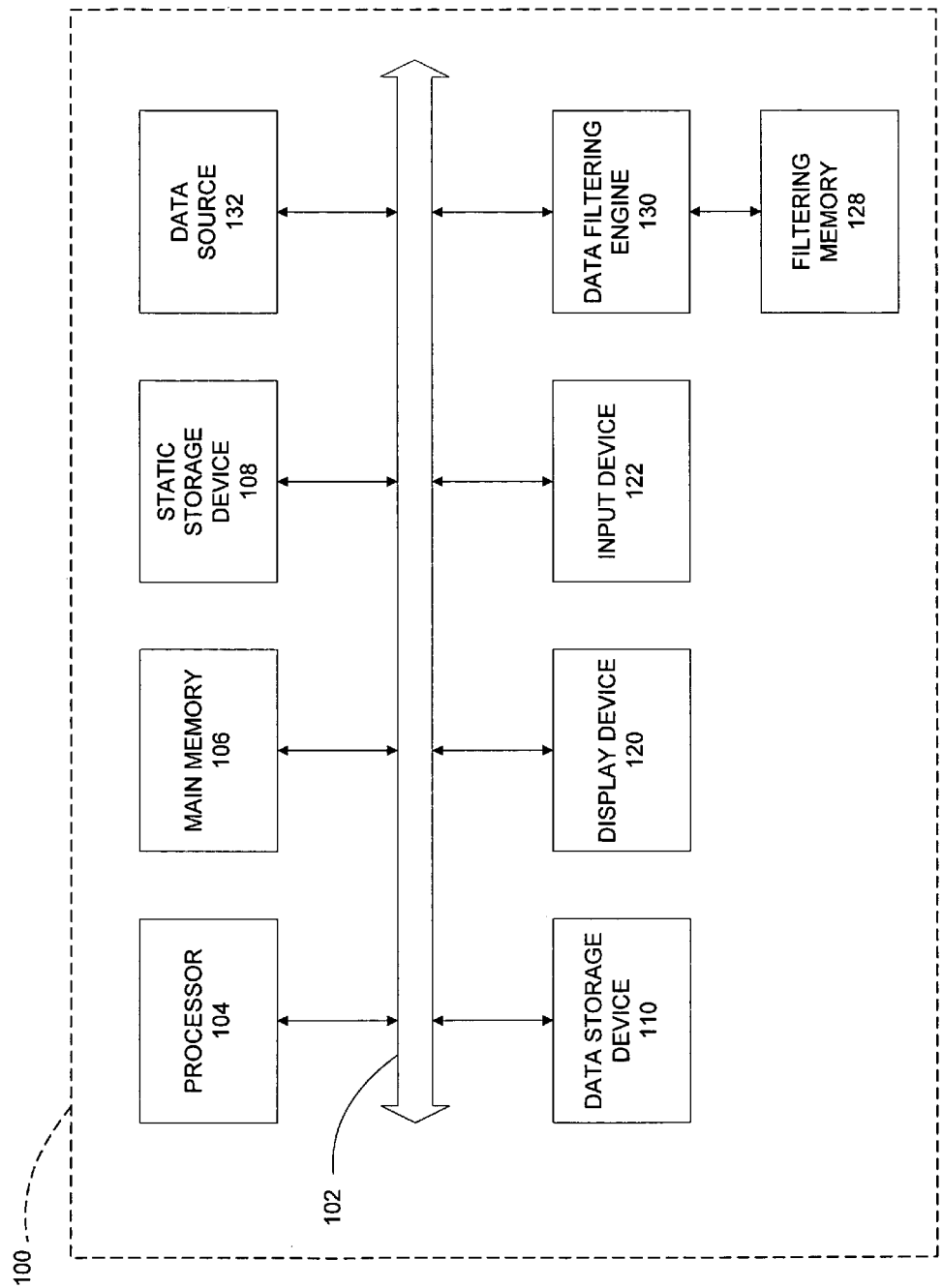
FIG. 1 shows a block diagram of one embodiment of the present invention.

Referring now to FIG. 1, a block diagram of a computer system 100 upon which one embodiment of the present invention can be implemented is shown. Computer system 100 comprises a bus or other communication means 102 for communicating information, and a processing means 104 coupled to bus 102 for processing information. Processor 104 may be the main processor for computer system 100 or may be a dedicated processor for a Data Filtering System 200 shown in FIG. 2. System 100 further comprises a random access memory (RAM) or other dynamic storage device 106 (referred to as main memory), coupled to bus 102 for storing information and instructions to be executed by processor 104. Main memory 106 also may be used for storing temporary variables or other intermediate information during execution of instructions by processor 104. Computer system 100 also comprises a read only memory (ROM) and/or other static storage device 108 coupled to bus 102 for storing static information and instructions for processor 104. Data storage device 110 is coupled to bus 102 for storing information and instructions. A data storage device 110 such as a magnetic disk or optical disk and its corresponding disk drive can be coupled to computer system 100.

Computer system 100 further comprises a Filtering Memory 128 coupled to a Data Filtering Engine 130. The size and type of Filtering Memory 128 is programmable and not limited to any particular size or type of memory. For example, Filtering Memory 128 may be a 16 Mbyte Synchronous Dynamic RAM (SDRAM). One skilled in the art will also realize that Filtering Memory 128 may also be contained in main memory 106 or some other storage device, such as static storage device 108 of computer system 100. The details and structure of Filtering Memory 128 are described below in more detail with reference to FIGS. 2 and 3.

Computer system 100 also comprises a Data Filtering Engine 130 coupled via bus 102 to processor 104. Data Filtering Engine 130 filters or classifies input data according to tests or rules performed on data elements in the input data. Data elements are specified segments of data in a block of input data. The details and operation of Data Filtering Engine 130 is described below in more detail with reference to FIGS. 7 and 8. Computer system 100 also comprises a data source 132 for providing data to be filtered by the Data Filtering Engine 130.

Figure 2:
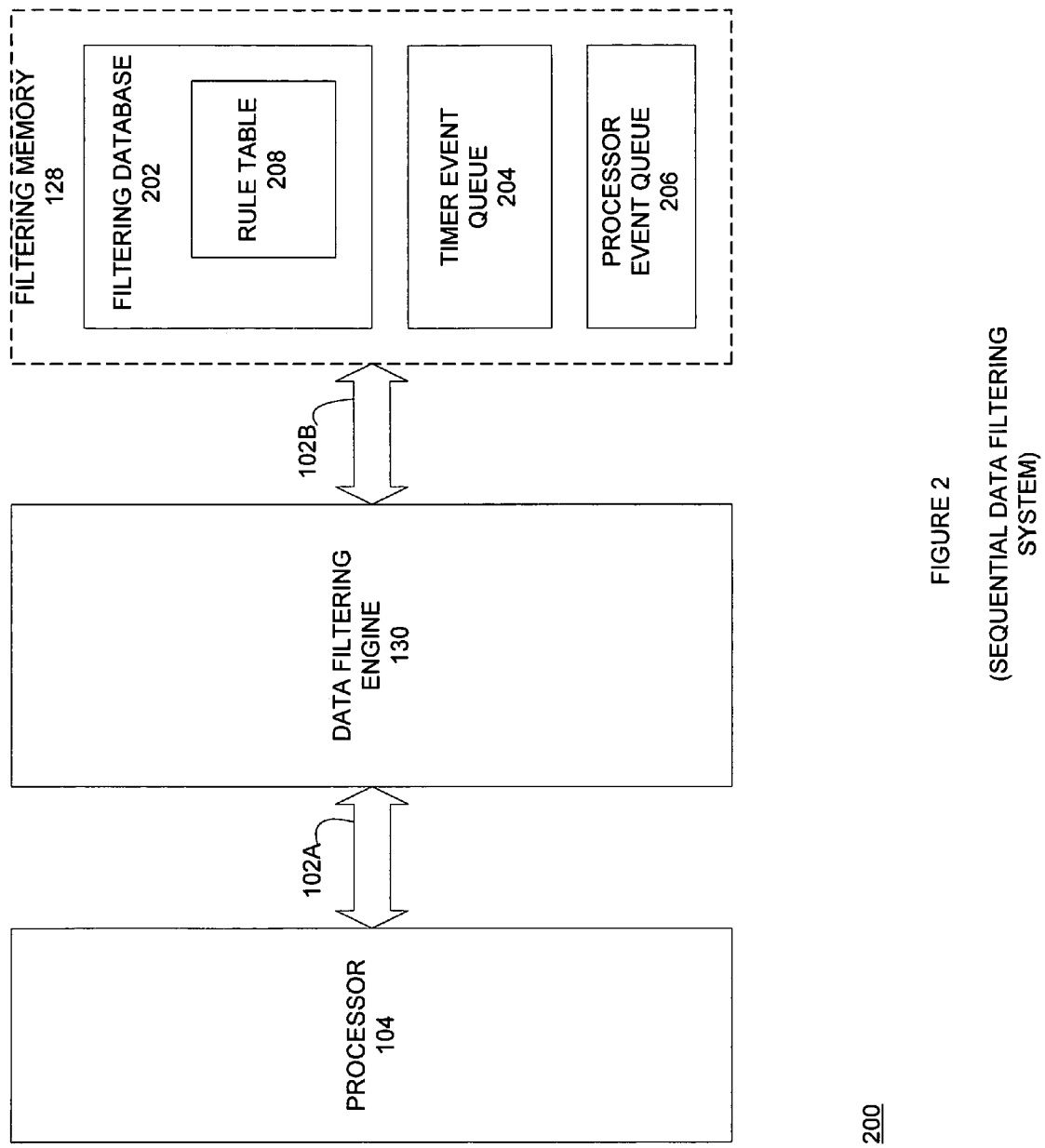
FIG. 2 shows a block diagram of a preferred embodiment of a sequential implementation of a data filtering system in accordance with the present invention.

Referring now to FIG. 2, a block diagram of a preferred embodiment of a sequential implementation of a Data Filtering System 200 is shown. A Data Filtering System 200 uses layered rule tables stored in Filtering Memory 128 to filter or classify input data based on data elements in the input data. Data Filtering System 200 comprises processor 104 coupled to Data Filtering Engine 130 via bus 102A, and Filtering Memory 128 coupled via bus 102B to Data Filtering Engine 130. As described above, processor 104 may be the main processor for computer system 100 or may be a dedicated processor for Data Filtering System 200. Bus 102A may comprise a PCI bus or any conventional bus for allowing communication between processor 104 and Data Filtering Engine 130. Data Filtering Engine 130 is described below in more detail with reference to FIGS. 7 and 8. Bus 102B may comprise a memory interface, such as a RAMBUS or Direct RDRAM interface, or any conventional bus for allowing communication between Data Filtering Engine 130 and Filtering Memory 128.

Filtering Memory 128 preferably comprises a Filtering Database 202, a Timer Event Queue 204, and a Processor Event Queue 206. Filtering Database 202 stores layered tables of rules or "rule tables" 208. Filtering Database 202 may comprise one or more rule tables 208 linked together as a mutli-way decision tree. Rule tables 208 are described below in more detail with reference to FIGS. 3–6. Timer Event Queue 204 stores the Table ID of tables scheduled for Rule Timer processing. The Rule Timer processing is described below in more detail with reference to FIGS. 5A and 5B. Processor Event Queue 206 stores event messages which are to be available for processor 104. As discussed above with reference to Filtering Memory 128, the sizes of Filtering Database 202, Timer Event Queue 204, and Processor Event Queue 206 are also programmable and not limited to any particular size or type of memory.

Figure 3:
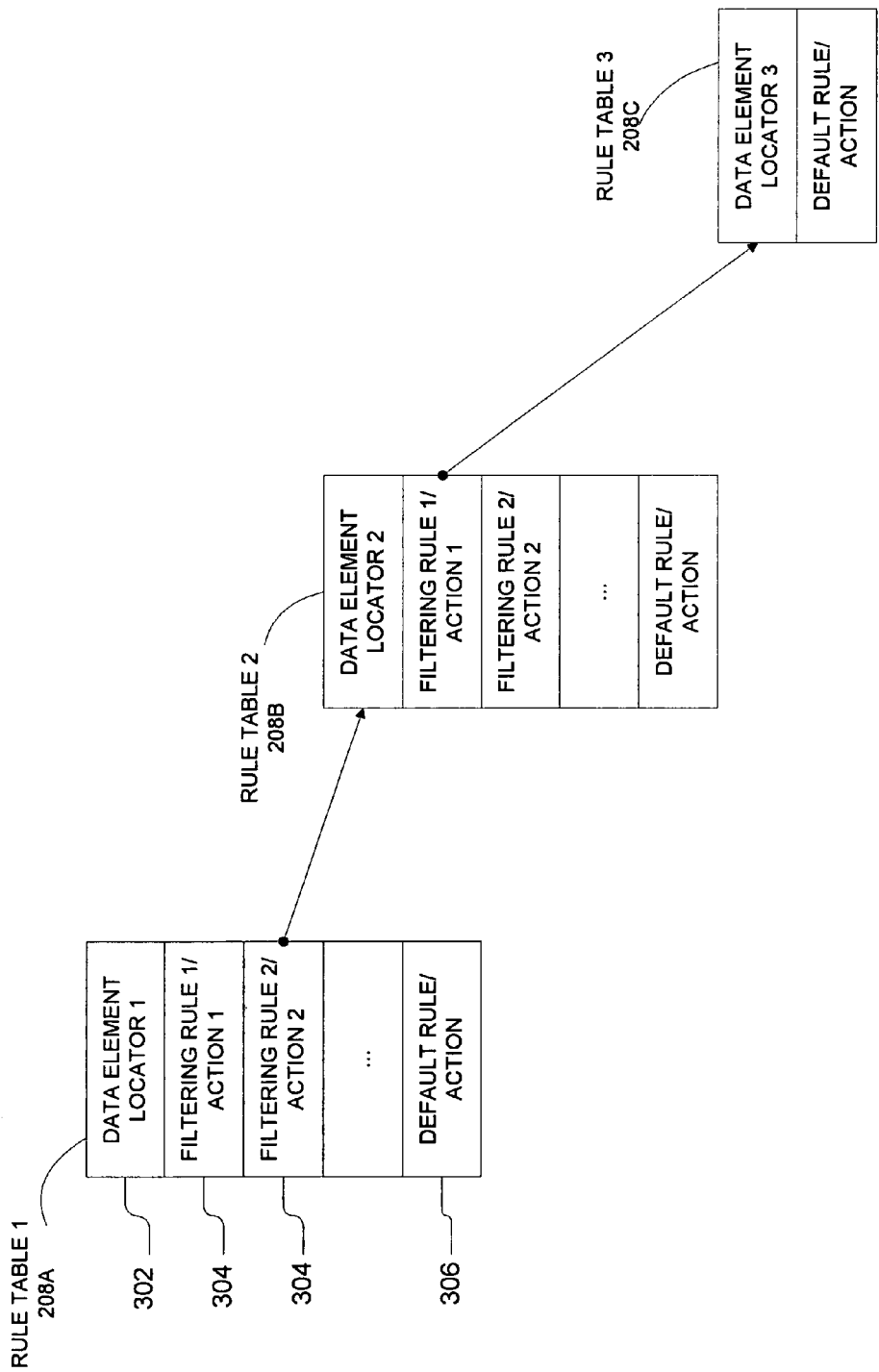
FIG. 3 shows a block diagram of a preferred embodiment of a multi-way decision tree as linked rule tables in accordance with the present invention.

Filtering Database 202 is preferably organized as layered tables of rules, in other words, a tree of Rule Tables 208. Referring now to FIG. 3, a preferred embodiment of a multi-way decision tree as linked Rule Tables 208 is shown. A layered table of rules may comprise one Rule Table or a plurality of Rule Tables 208A, 208B, and 208C. Rule Table 208 comprises a Data Element Locator 302, a Default Rule 306, and zero or more Filtering Rules 304. Data Element Locator 302 specifies the size and location of the field in the input data block that is to be tested with Filtering Rules 304 in Rule Table 208. The structure of Data Element Locator 302 is described below in more detail with reference to FIG. 4. A single Rule Table 208 comprises all Filtering Rules 304 and Default Rule 306 which are associated with the data element indicated by Data Element Locator 302 for a particular Rule Table 208. Each Filtering Rule 304 in a Rule Table 208 comprises a test to be applied to the data element indicated by Data Element Locator 302 of the Rule Table 208 and an associated Action. As used herein, an Action associated with a Filtering Rule 304 refers to the action that is executed if the Filtering Rule 304 is true or otherwise satisfied. Action may be either a link or pointer to another Rule Table 208 or a User Data (Tag) that is returned to the host processor 104. Preferably, the processor software defines the meaning of a particular Tag. Default Rule 306 and its associated Action define what happens when no other rule in a single Rule Table 308 is true. In other words, it is the specified action to be taken when a data element fails all of the Filtering Rules 304 in a Rule Table 208 or when there are no Filtering Rules 304. The structure of Filtering Rule 304 and Default Rule 306 is described below in more detail with reference to FIGS. 5A and 5B.

The present invention operates upon layered tables of rules where each table applies to a separate data element in the input data as opposed to classical Binary tree algorithms with a single test field. The distinction between filtering or classifying input data using layered tables of rules and data elements versus ordinary binary trees and a predetermined byte size of data is important to the invention. Because the system does not require a predetermined byte size of data, the present invention advantageously allows data elements of any size to be classified or filtered thereby increasing the efficiency while decreasing the cost of the system.

Figure 4:
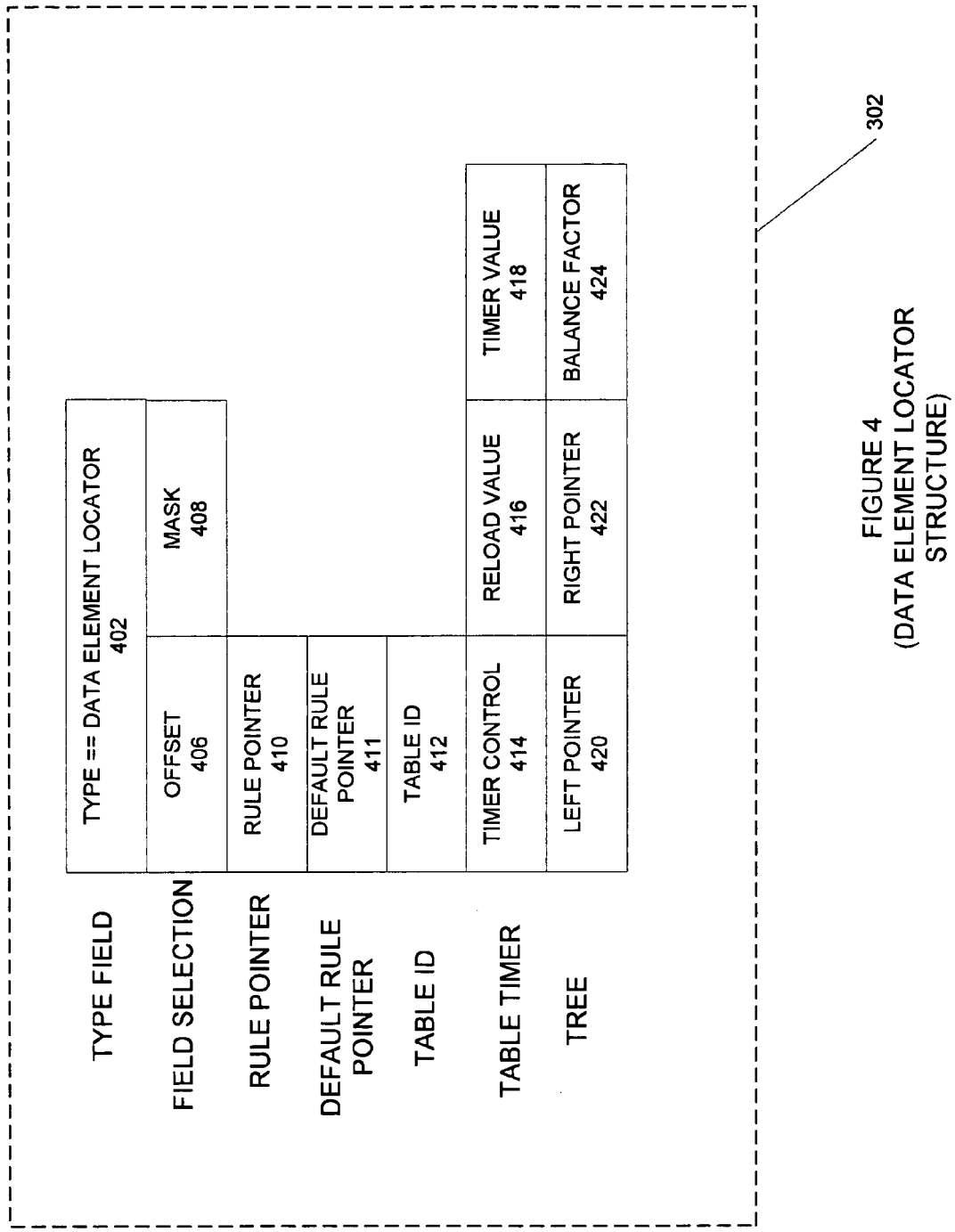
FIG. 4 shows a block diagram of a preferred structure of a data element locator in accordance with the present invention.

Referring now to FIG. 4, a block diagram of a preferred structure for a Data Element Locator 302 is shown. Data Element Locator 302 comprises several fields including a type field 402 to indicate the type of data structure as a Data Element Locator and a field selection field comprising an Offset 406 and a Mask 408. Data Element Locator 302 also comprises a Rule Pointer 410 for pointing to a particular Filtering Rule 304 and a Default Rule Pointer 411 for pointing to a particular Default Rule 306. For example, Rule Pointer 410 may point to the root of an AVL tree containing the filtering rules for a Rule Table. Data Element Locator 302 also comprises a Table ID 412, a Table Timer field 414, 416, and 418, and a Tree field comprising Left Pointer 420, Right Pointer 422, and Balance Factor 424. Table ID 412 and Tree fields, Left Pointer 420, Right Pointer 422, and Balance Factor 424, are used to increase the processing speed of the Table Timers. The Tree fields (Left Pointer 420, Right Pointer 422 and Balance Factor 424), are used in the well known AVL tree algorithm. In the present invention, the Tree fields organize Data Element Locators 302 into a table sorted by Table Id 412. A data element in a block of input data is specified by a starting reference location indicated by the Offset 406, and Mask 408. The portion of the block of input data or subparts of the block which are not part of the data element is masked off with the Mask 408 from Data Element Locator 302. Thus, Data Element Locator 302 allows only the selected data element of the input data to be operated upon. Moreover, it allows data to be processed according to data elements, which are defined by the operator.

In a preferred embodiment, each Rule Table 208 may also have an associated table timer stored as part of the Data Element Locator 302. As shown in FIG. 4, a Table timer comprises a Timer Control 414, a Reload Value 416, and a Timer Value 418. Timer Control 414 is used to enable or disable timer processing for Rule Table 208. An external clock input is used to run the table timer process. The external clock is divided by a value stored in an internal register to provide a table tick. All of the table timers are processed on each table tick. The table timers determine how frequently filtering rule timers are to be processed. When a Timer Value 418 expires, i.e. when it decrements to zero or some other specified value, Timer Value 418 will be reloaded from Reload Value 416. Table ID 412 is then placed in the table timer queue (not shown) for the associated filtering rule timers to be processed individually.

Referring now to FIGS. 5A and 5B, block diagrams of preferred structures of a Filtering Rule 304 and a Default Rule 306, respectively, are shown. Filtering Rule 304 preferably comprises a type field 502 to indicate the type of data structure as a filtering rule, and a range test field comprising a Lower Bound 506 and an Upper Bound 508. Filtering Rule 304 also comprises a Rule Tree field comprising a Left Pointer 510, a Right Pointer 512, and a Balance Factor 514, an Action field comprising an Instruction 516 and a User Data (Tag) 518, a Rule Timer field and a Statistics field. The Rule Tree field comprising Left Pointer 510, Right Pointer 512, and Balance Factor 514, are used by the well known AVL Tree algorithm to sort the rules in a filter table by the Lower Bound 506 and Upper Bound 508. Instruction 516 comprises an instruction to be executed if Filtering Rule 304 is true or otherwise satisfied. Instruction 516 may be a pointer to another Rule Table 208 or an instruction to return the User Data (Tag) 518 to processor 104.

Filtering Rule 304 specifies a test or comparison to be performed on a data element indicated by Data Element Locator 302. In a preferred embodiment, Filtering Rule 304 specifies an inclusive range test comprising Lower Bound 506 and Upper Bound 508. Thus, a Filtering Rule 304 is true when the selected data element from the input data block satisfies the range test. In other words, a Filter Rule is true when:

Lower Bound<=(selected data element from input data block)<=Upper Bound is true. When Filtering Rule 304 comprises a Lower Bound 506 and Upper Bound 508 with the same value, this is identical to an equality test. Filtering Rule 304 is not limited to any particular type of test and one skilled in the art will realize that Filtering Rule 304 may comprise any type of test that may be satisfied by the selected data element. For example, if an input data block comprises information about widgets and a data element of the input data block is "color", then Filtering Rule 304 may be a test for determining whether the data element is equal to "red". Thus, a Filtering Rule 304 comprising a test for "red" is an equality test, whereas a Filtering Rule 304 comprising a test "orange to red" is a range test. In such example, it is assumed that "red" is assigned a numeric value rather than the ASCII string "red."

Default Rule 306 specifies an action to be executed when none of Filtering Rules 304 in a Rule Table 208 are satisfied or when there are no Filtering Rules 304 in Rule Table 208. As shown in FIG. 5B, Default Rule 306 comprises a type field 550 to indicate the type of data structure as a default rule, an action field comprising an Instruction 554 and a User Data (Tag) 556, a Rule Timer field and a Statistics field. Instruction 554 comprises an instruction to be executed by Data Filtering Engine 130. Instruction 554 may be a pointer to another Rule Table 208 or an instruction to return the User Data (Tag) 556 to processor 104.

In a preferred embodiment, Filtering Rule 304 and Default Rule 306 may also have associated timers for allowing timer processing. Timer processing may occur as a background process to the data classification and filtering process. Preferably, a rule timer comprises a Timer Control 520,558, a Reload Value 522,560, and a Timer Value 524, 562. Timer Value 524, 562 keeps track of the value of the timer as it is processed. Timer Control 520, 558 determines what action occurs when Timer Value 524, 562 is a certain value. If Timer Value 524, 562 is non-zero, it is decremented when the timer is processed. When Timer Value 524, 562 changes from one to zero, Timer Control 520, 558 determines the next action to be executed. For example, Timer Control 520, 558 may comprise timeout options that may occur when Timer Value 524, 562 expires, i.e. decrements to zero or some other specified value. Timer Value 524, 562 may be reloaded from Reload Value 522, 560, and processor 104 may be notified that this time out has occurred. The individual Filtering Rule 304 or Default Rule 306 may be deleted. In the preferred embodiment when a Default Rule is deleted the entire associated rule table is deleted to prevent the accidental creation of Rule Tables with out a Default Rule.

In a preferred embodiment, Filtering Rule 304 and Default Rule 306 may also comprise statistics processing and threshold testing. Preferably, a statistic comprises a Statistics Control 526, 564, a Threshold 528, 566, and a Value 530, 568. Statistics Control 526, 564 determines what action is to be executed when Value 530, 568 reaches Threshold 528, 566. In a preferred embodiment, statistics have only one Threshold 528, 566. Alternatively, separate minimum and maximum thresholds could be added at the cost of some additional memory. Applications of a Data Filtering Engine may collect statistics associated with some or all of the entries in a Filtering Database 202. Statistics may be associated with an individual Filtering Rule 304 or Default Rule 306. Value 530, 568 is potentially incremented whenever a Filtering Rule 304 or Default Rule 306 is true for an input data block being filtered. The increment is controlled by Statistics Control 526, 564. It may be set to only increment statistics value 530, 568 when it is an end node, i.e. User Data (Tag) 518, 556 is to be returned or one block of input data may cause several statistics Value 530, 568 in different rule tables to be incremented. Statistics Control 526, 564 may be configured inactive for any given Filtering Rule 502 or Default Rule 550. Statistics may be sent to processor 104 (a statistics event) on a fixed interval by combining timers and statistics. The statistic would then be reset when this occurs. Processor 104 could also be notified only if Threshold 528, 566 is exceeded in the same interval. This feature could be used to detect security problems. Processor 104 could also be notified only if Threshold 528, 566 was not met in the same interval. This feature could be used to implement idle traffic timers.

Figure 6:
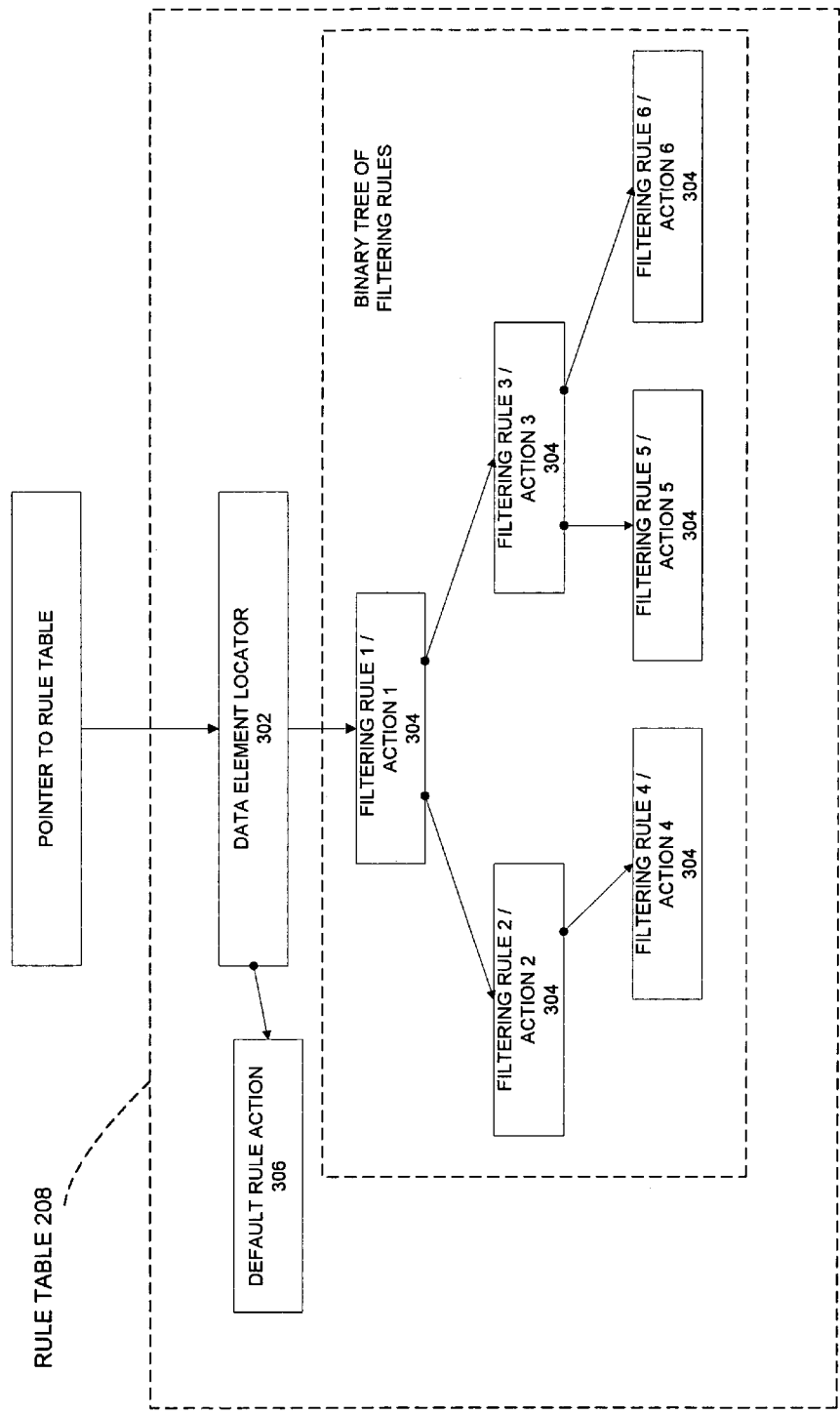
FIG. 6 shows a block diagram of a preferred embodiment of a rule table comprising a Data Element Locator, Default Rule and a binary tree of Filtering Rules in accordance with the present invention.

In a preferred embodiment, the Filtering Rules in a Rule Table 208 are organized as a binary tree sorted by their Lower Bound and Upper Bound fields. Referring now to FIG. 6, a block diagram of a preferred embodiment of a Rule Table 208 with the Filtering Rules 304 organized as a binary tree is shown. One skilled in the art will realize that multiple other data structures, such as sorted lists and arrays, are also possible for implementing Rule Table 208, and that the present invention is not limited to a single data structure for Rule Table 208.

Figure 7:
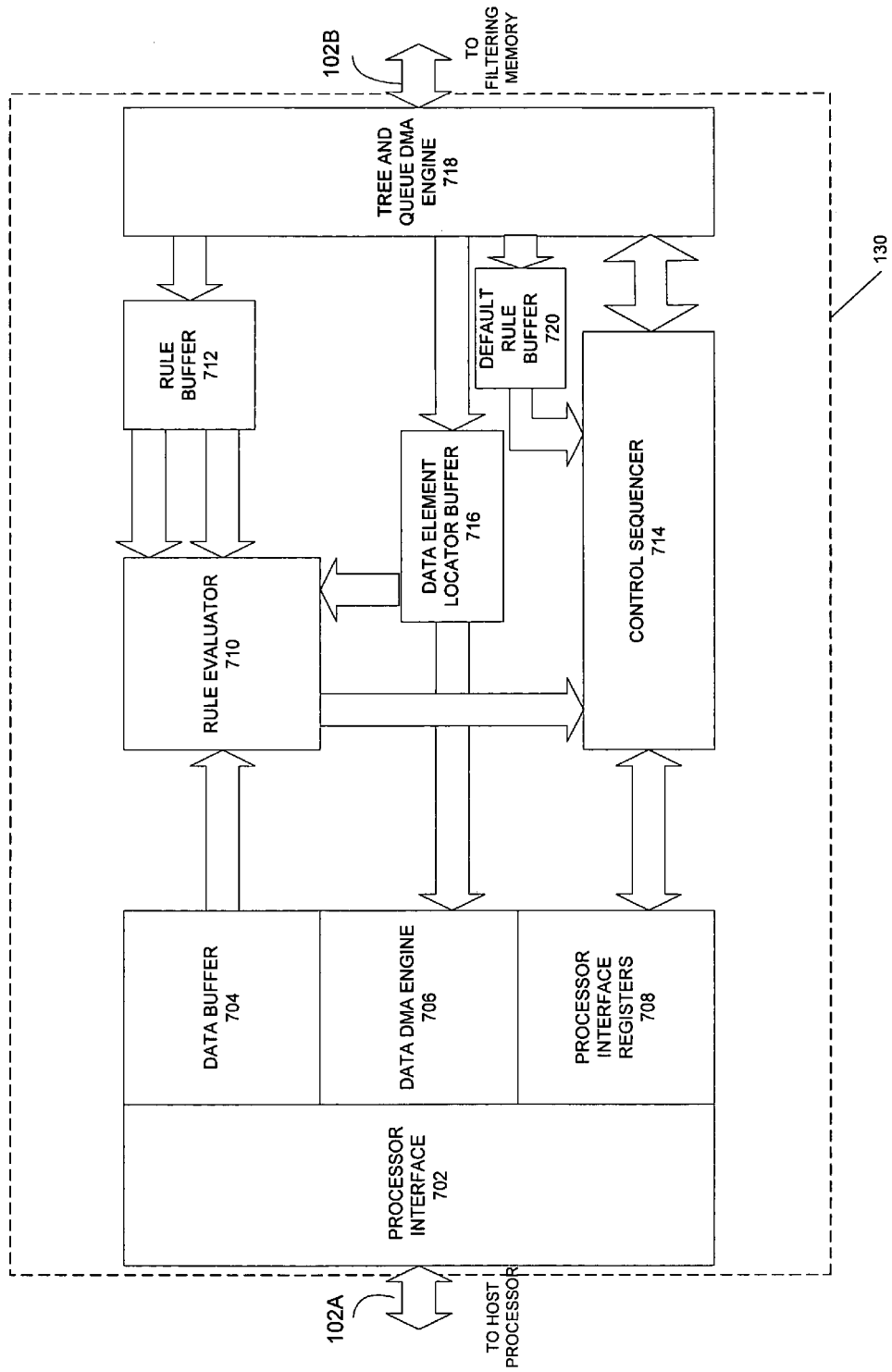
FIG. 7 shows a block diagram of a preferred embodiment of a data filtering engine in accordance with the present invention.

Referring now to FIG. 7, a block diagram of a preferred embodiment of a sequential Data Filtering Engine 130 is shown. Data Filtering Engine 130 comprises a Processor Interface 702, a Data Buffer 704, a Data Direct Memory Access (DMA) Engine 706, Processor Interface Registers 708, a Rule Evaluator 710, a Rule Buffer 712, a Control Sequencer 714, a Data Element Locator Buffer 716, a Tree and Queue DMA Engine 718, and a Default Rule Buffer 720. Processor Interface 702 couples DMA Engine 706 and Processor Interface Registers 708 to Processor 104 via bus 102A. Processor Interface 702 may be any conventional interface, such as a PCI bus. Data Buffer 704 stores input data to be used by Rule Evaluator 710 and is any conventional memory storage device. Alternatively, input data may be stored in any other conventional memory accessible by Rule Evaluator 710. Data DMA Engine 706 moves the input data stored in the Host Processor Memory to the Data Buffer 704 for use by Rule Evaluator 710. Preferably, Data DMA Engine 706 is a conventional DMA device such as an Intel 8237 DMA controller or the IDMA function of a Motorola communications processor. Processor Interface Registers 708 allow communication between the processor software, i.e. driver software, and Data Filtering Engine 130. Processor Interface Registers 708 may be any conventional registers and contain information and functions such as interrupts, the size and type of Filtering Memory 128, the configuration of Data DMA Engine 706, queues for timer and statistic events and commands from and responses to the processor 104. Rule Evaluator 710 applies a Rule Table 208 to the data element indicated by Data Element Locator 302. Preferably, Rule Evaluator 710 performs a masking operation and range test that are described below in more detail with reference to FIG. 8. Rule Buffer 712 stores a Filtering Rule 304 used by Rule Evaluator 710. Control Sequencer 714 executes commands requested by processor 104 and processes timers as a background task. Control Sequencer 714 also uses Tree and Queue DMA Engine 718 to access Filtering Database 128 in response to a command to find a Data Element Locator 302, a Filtering Rule 304 or a Default Rule 306. Data Element Locator Buffer 712 stores Data Element Locator 302 used by Rule Evaluator 710 and Data DMA Engine 706. Rule Buffer 712 stores the Filtering Rule 304 used by Rule Evaluator 710. Default Rule Buffer 720 stores the Default Rule 304 used by the Control Sequencer 714. Tree and Queue DMA Engine 718 manages Filtering Memory 128 and provides free list management, access to Filtering Database 202, and queue management for Timer Event Queue 204 and Processor Event Queue 206.

In operation, input data to be filtered is stored in host processor memory. Tree and Queue DMA Engine accesses Rule Table 208 which contains Data Element Locator 302 and possible Filtering Rules 304 and Default Rule 306 to be used for a particular data element in a block of input data. Data Element Locator 302 is stored to Data Element Locator Buffer 716 and Filtering Rule 304 is stored in Rule Buffer 712. Default Rule 306 is stored in Default Rule Buffer 720. Data DMA Engine 706 moves the input data stored in host processor memory to the Data Buffer 704 to be used by Rule Evaluator 710. Rule Evaluator 710 then applies Data Element Locator 302 to the block of input data in Data Buffer 704 and determines the data element of the input data block using Data Element Locator 302. Rule Evaluator 710 then applies the Filtering Rule 304 to the data element indicated by Data Element Locator 302. When a Filtering Rule 304 for the data element is true, then the associated Action is executed. When none of the Filtering Rules 304 is true or when there are no Filtering Rules 304, the action associated with Default Rule 306 is executed.

Figure 8:
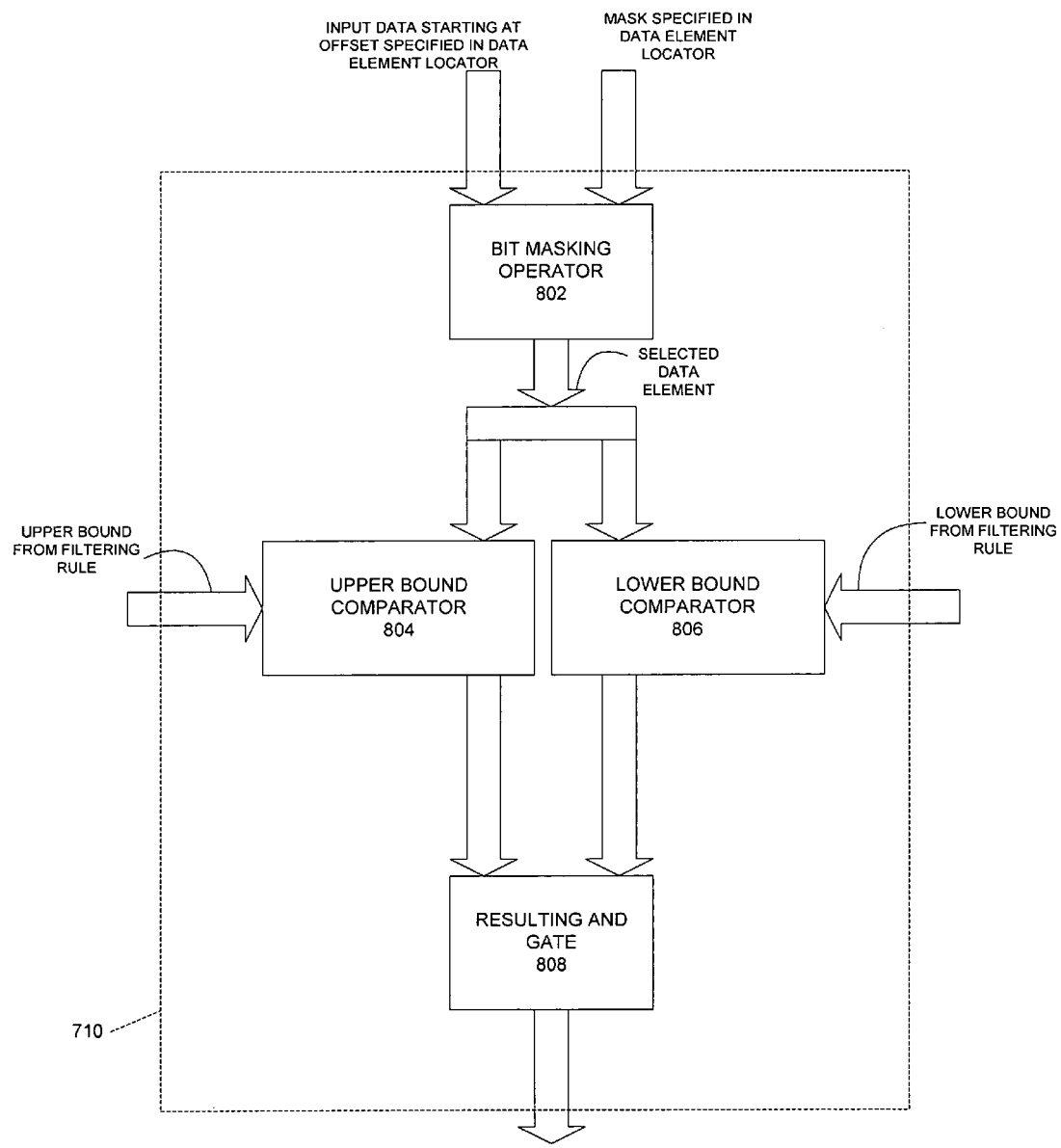
FIG. 8 shows a block diagram of a preferred embodiment of a rule evaluator in accordance with the present invention.

Referring now to FIG. 8, a functional block diagram of a preferred embodiment of Rule Evaluator 710 is shown. Rule Evaluator 710 comprises a Bit Masking Operator 802, an Upper Bound Comparator 804, a Lower Bound Comparator 806, and a Resulting AND gate 808. Bit-wise Masking Operator 802 is coupled to receive the input data starting at Offset 406 and the Mask 408 specified in Data Element Locator 302. Bit Masking Operator 802 outputs the data element from the input data. Upper Bound Comparator 804 is coupled to receive the Upper Bound 508 from Filtering Rule 304 and the selected data element. Lower Bound Comparator 806 is coupled to receive the Lower Bound 506 from Filtering Rule 304 and the selected data element. Resulting AND gate 808 is coupled to receive the outputs from Upper Bound Comparator 804 and from Lower Bound Comparator 806 and produces a true or false result. Thus, Rule Evaluator 710 selects or determines the data element from the input data by performing a bit-wise AND on the input data starting at Offset 406 and the Mask 408. The selected data element from the input data is then compared with the Upper Bound 508 of a Filtering Rule 304 and with the Lower Bound 506 of a Filtering Rule 304. Preferably, Upper Bound Comparator 804 determines whether the selected data element is equal to or less than the Upper Bound 508 and Lower Bound Comparator 806 determines whether the selected data element is equal to or greater than the Lower Bound 506. If the result of both comparators is true, then Resulting AND gate 808 asserts a "true" or "1" at its output. Otherwise, Resulting AND gate 808 asserts a "false" or "0" at its output.

Figure 9A:
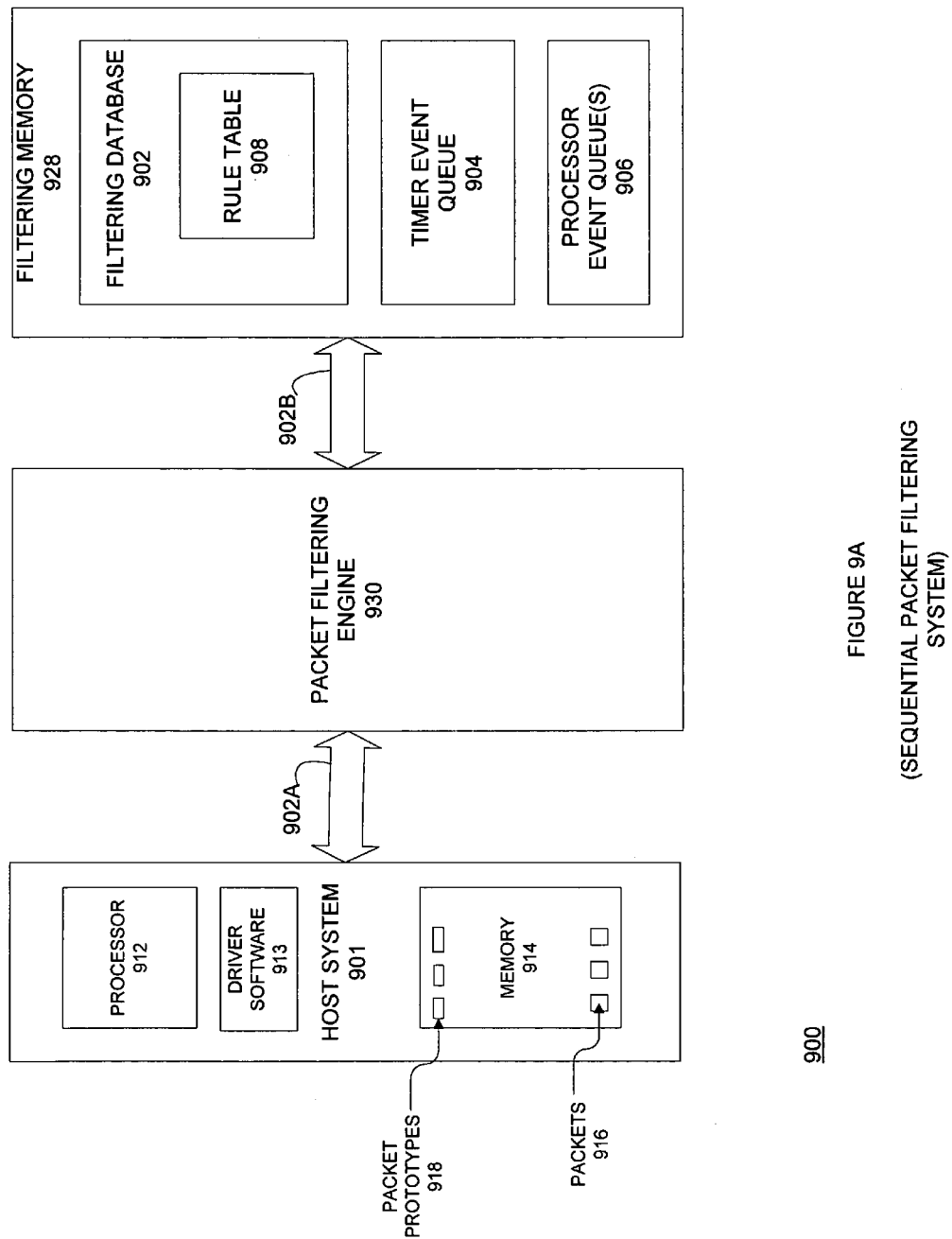
FIGS. 9A and 9B show block diagrams of a preferred embodiment of a sequential packet filtering system and a preferred embodiment of a Processor Event Queue in accordance with the present invention.

One skilled in the art will realize that the above description of a Data Filtering System 200 can apply to a broad range of information represented by the input data. However, in order to more fully understand the invention, an example of a system and method for a Data Filtering System 200 using a particular type of input data, a packet from a data communications system, will be used to illustrate the details and operation of the present invention. In packet-switched networks, data transferred from one device to another device across a network are typically broken down into smaller blocks of data called packets. In order for a device receiving a packet to process the packet, the device needs to filter or classify the incoming packet. One embodiment of the present invention allows a device to filter incoming packets. Referring now to FIG. 9A, a block diagram of a preferred embodiment of a sequential implementation of a Packet Filtering System 900 is shown. A sequential Packet Filtering System 900, which may also be referred to as a "Packet Classification System," assigns individual packets in a data stream a type, class or flow identifier or "tag". Additionally, the Packet Filtering System 900 may modify the Filtering Database 902 according to instructions received from the Host System 901. Packet filtering or classification is a basic requirement of networking devices such as routers, upper layer switches, firewalls and bandwidth managers. Once a packet has been classified, the host system can take appropriate action with the packet.

Packet Filtering System 900 comprises a host system 901 coupled to Packet Filtering Engine 930 via bus 902A, and Filtering Memory 928 coupled via bus 902B to Packet Filtering Engine 930. Host system 901 preferably comprises a processor 912, driver software 913, and a memory 914 for storing packets 916 and packet prototypes 918. Processor 912 may be the main processor for host system 901 or may be a dedicated processor for Packet Filtering System 900. Bus 902A may comprise a PCI bus or any conventional bus for allowing communication between host system 901 and Packet Filtering Engine 930. Packet Filtering Engine 930 is described below in more detail with reference to FIGS. 15–17. Bus 902B may comprise a memory interface, such as a RAMBUS or Direct RDRAM interface, or any conventional bus for allowing communication between Packet Filtering Engine 930 and Filtering Memory 928.

Figure 9B:
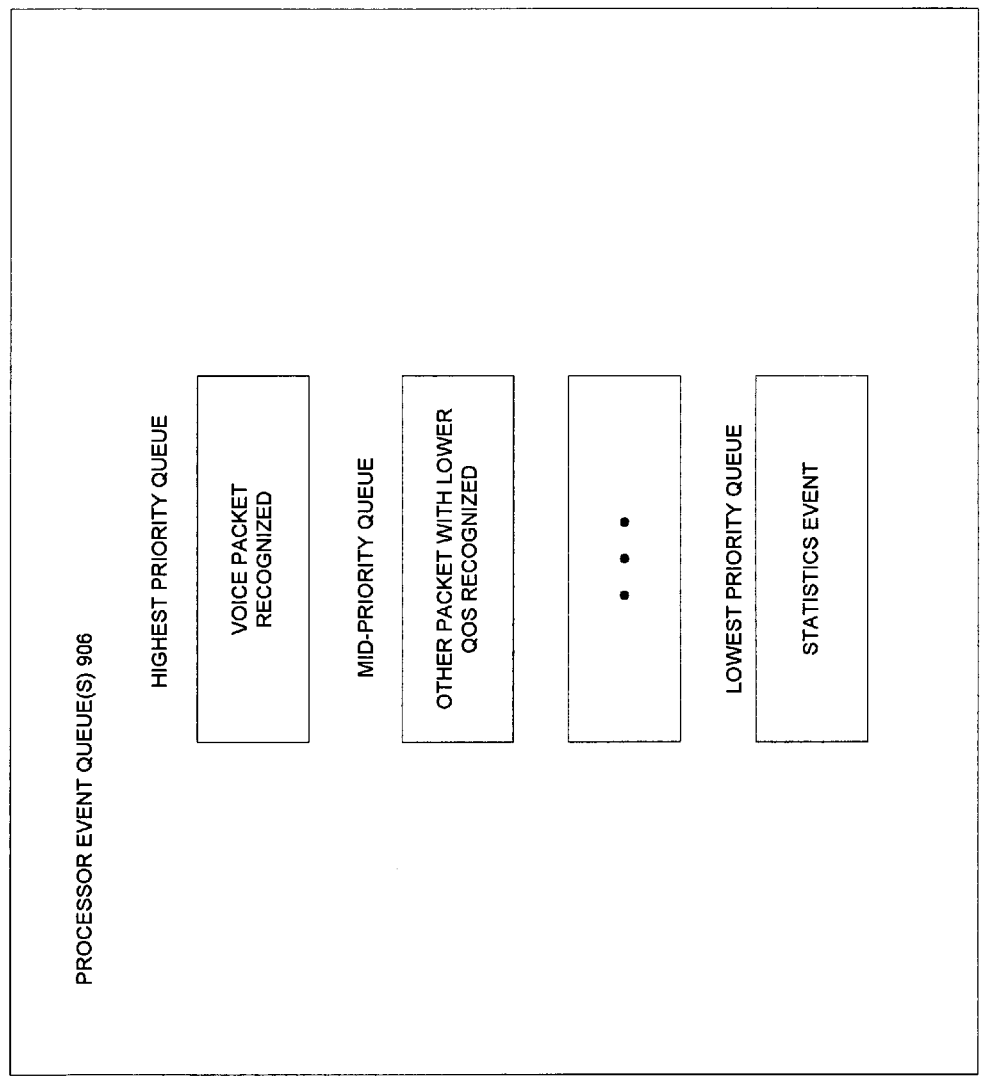

Filtering Memory 928 preferably comprises a Filtering Database 902, a Timer Event Queue 904, and a Processor Event Queue(s) 906. Filtering Database 902 stores layered tables of rules or "rule tables" 908. Filtering Database 902 may comprise one or more rule tables 908 linked together as a multi-way decision tree. Thus, each node of the tree is a Rule Table 908. Rule tables 908 for Packet Filtering System 900 are described below in more detail with reference to FIGS. 11–14. Timer Event Queue 904 stores the Table ID of tables scheduled for Rule Timer processing. Processor Event Queue(s) 906 store event messages that are to be sent to host system 901. Referring now to FIG. 9B, a preferred embodiment of a Processor Event Queue(s) 906 is shown. Processor Event Queue(s) 906 may support multiple prioritized sub-queues. Support for multiple prioritized sub-queues within the Processor Event Queue(s) 906 advantageously allows the Packet Filtering Engine 930 to be used for quality of service (QoS) decisions. When a high priority packet such as a Voice Over IP (VOIP) or a packet with a high IP precedence is recognized the associated message can be stored in a higher priority queue. The host processor software will determine how each queue is serviced (weighted fair queuing, etc . . . ). As discussed above with reference to Data Filtering System 200, the sizes of Filtering Database 902, Timer Event Queue 904, and Processor Event Queue 906 are also programmable and not limited to any particular size or type of memory. Alternatively, Packet Filtering System 900 could use the host system memory for Filtering Memory 928. In a preferred embodiment, Filtering Memory 928 is a 64 bit Synchronous DRAM allowing approximately 8 million rules to be evaluated per second or approximately 5 million rules to be evaluated per second if statistics and timers are used. Thus, the present invention advantageously supports a very complex filtering system, such as for an OC3 connection (155 Mbits/second).

Figure 10:
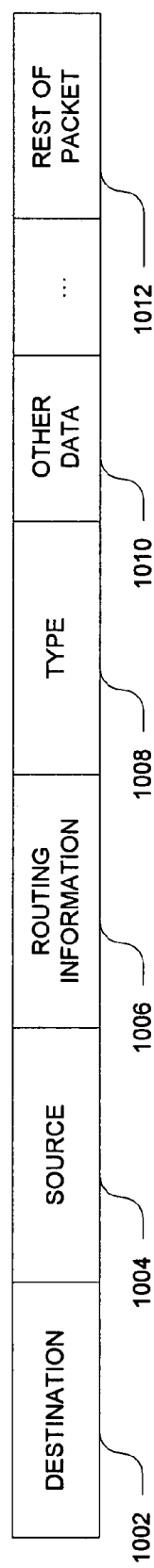
FIG. 10 shows a block diagram of an example of a packet.

A packet filtering system in accordance with the present invention operates upon protocol elements within a packet 916. Protocol elements correspond to fields in a packet 916, which fields are indicated by a communication protocol, such as TCP/IP, IPX/SPX and IPv6. Communication protocols, which are well known in the art, provide the rules for communication between network devices and specify the format for packets 916. Referring now to FIG. 10, a block diagram of an example format for a packet 916 is shown. In this example, the packet 916 comprises a destination field 1002, a source field 1004, a routing information field 1006, a type field 1008, an other data field 1010, and a rest of packet field 1012. Destination field 1002 comprises information indicating the destination for packet 916. Source field 1004 comprises information indicating the source of packet 916. Other data field 1010 in this example indicates that a packet may comprise additional fields in the header for indicating other information such as header length, payload length and hop limit, to name a few. Each of the fields shown in FIG. 10 is an example of a protocol element as the term is used in this specification. Thus, destination field 1002 is one protocol element and source field 1004 is a different protocol element. Protocol elements or fields may have a fixed size or a variable-length. Communication protocols and packet formats are well known in the art and one skilled in the art will realize that FIG. 10 is for illustrative purposes only, and that any number of fields may exist for any particular packet depending on the communication protocol. One skilled in the art will also realize that the principles of the present invention may be applied to protocol elements or fields in packets formatted according to any communication protocol. Thus, the present invention is not limited to any particular communication protocol nor is it limited to a specific protocol element. A packet filtering system based on protocol elements in accordance with the present invention provides a more natural programming interface than a byte oriented device. Thus, the present invention advantageously results in easier customer integration and reduced time to market.

A packet filtering system in accordance with the present invention may also modify the Filtering Database 902. In other words, the packet filtering system of the present invention may add a table or rule to the Filtering Database 902 or delete a table or rule from the Filtering Database 902. In order to modify the Filtering Database 902, a packet prototype 918 is used to determine a specific location or node within Filtering Database 902. As defined herein, a specific location or node within Filtering Database 902 may be a table or a rule, such as a filtering rule 1104 or a default rule 1106, which is to be modified, i.e. added, deleted or otherwise changed. Packet prototypes 918 are described below in more detail with reference to FIG. 18. A packet prototype 918 may be received or obtained from a source external to the Packet Filtering Engine 930. For example, a packet prototype 918 may be received from driver software 913 or middleware (not shown) for the device. Thus, the present invention advantageously allows a user to dynamically modify Filtering Database 902. Furthermore, a user of the present invention who desires to modify Filtering Database 902 does not need to know the underlying structure or mapping layout of Filtering Database 902. A user is only required to submit a packet prototype 918 to Packet Filtering System 900, which will use the packet prototype 918 to determine the specific location to be modified. Thus, the present invention provides an interface to Packet Filtering Engine 930, which advantageously allows a simple and efficient method for modifying Filtering Database 902.

Figure 11:
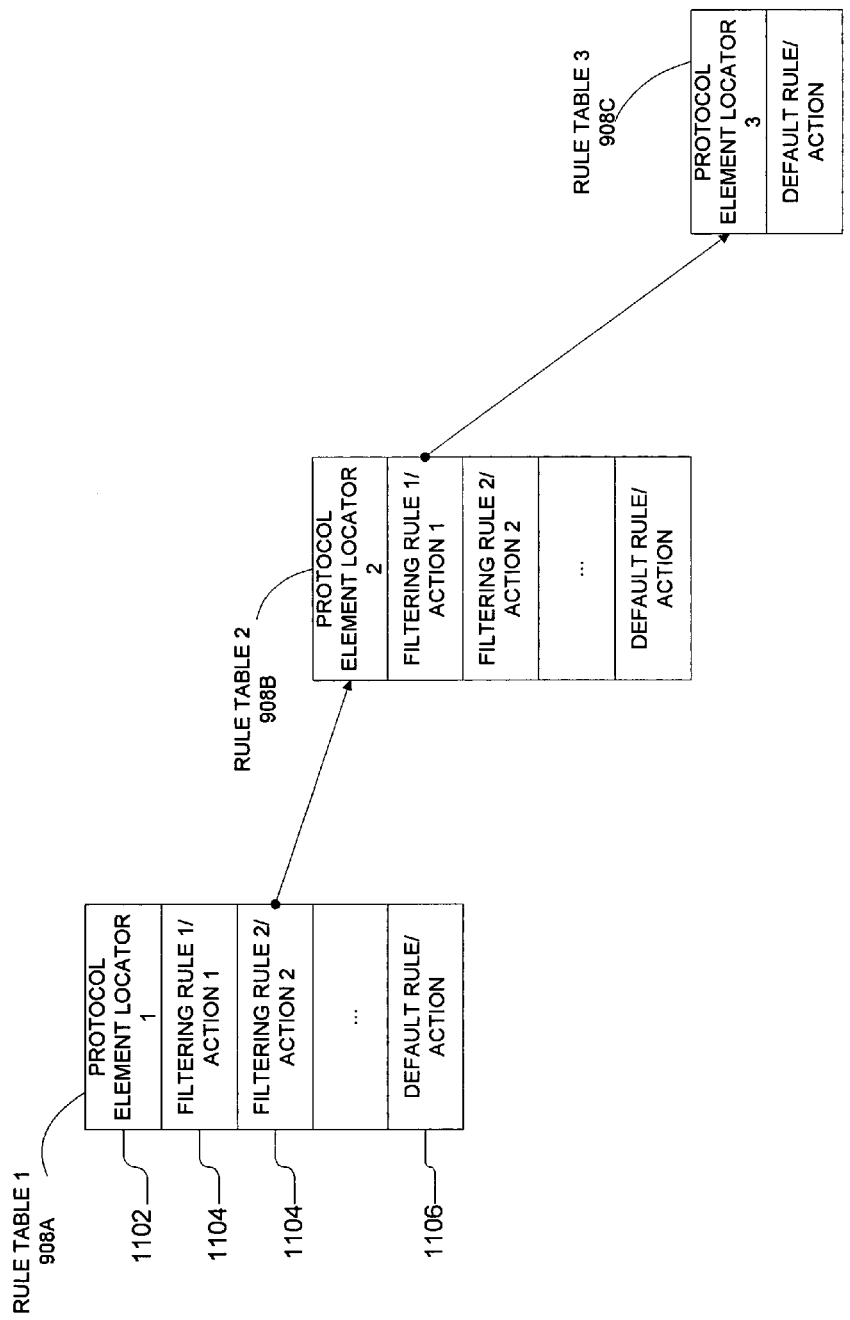
FIG. 11 shows a block diagram of a preferred embodiment of layered tables of rules for a packet filtering system.

As discussed above with reference to FIG. 3 and Data Filtering System 200, Filtering Database 902 is preferably organized as layered Rule Tables 908. Referring now to FIG. 11, a preferred embodiment of a multi-way decision tree as linked Rule Tables 908 is shown. The protocol elements may be used to prepare the layered tables of rules in Filtering Database 902. For simplicity, only a subsection of Filtering Database 902 is shown. A layered table of rules may comprise one Rule Table 908 or a plurality of Rule Tables 908A, 908B and 908C. Rule Table 908 comprises a Protocol Element Locator 1102, a Default Rule 1106, and zero or more Filtering Rules 1104. Protocol Element Locator 1102 specifies the size and location of the field in the packet to be tested with Filtering Rules 1104 in Rule Table 908. The Default Rule 1106 specifies the action taken if all the rules in the Rule Table 908 are false or otherwise not satisfied, or if there are no rules in the Rule Table 908. The structure of Protocol Element Locator 1102 is described below in more detail with reference to FIG. 12. A single Rule Table 908 comprises a group of Filtering Rules 1104 which will be applied to the protocol element indicated by Protocol Element Locator 1102 and a Default Rule 1106. Some protocol processing functions such as IP routing may advantageously use multiple rule tables with identical Protocol Element Locators. For example, an IP router will typically test all data packets with a table of "host routes" applied to the IP destination address (an element of the IP protocols). If there is no "host route" for a packet, the default rule for the "host route table" will then point to a table of "network routes" that also applies to the IP destination address.

Each Filtering Rule 1104 in a Rule Table 908 comprises a test to be applied to the protocol element indicated by Protocol Element Locator 1102 of Rule Table 908 and an associated Action. As used herein, an Action associated with a Filtering Rule 1104 refers to the action that is executed if the associated Filtering Rule 1104 is true or otherwise satisfied. Action may be either a link or pointer to another Rule Table 908, a command to the filtering engine, or a User Data (Tag) that is returned to a host processor. One skilled in the art will realize that a command to the Filtering Engine may comprise any variety of commands instructing the Filtering Engine what action to take with the packet. For example, a command to the Filtering Engine may be a command such as 'discard this packet and continue' or 'encrypt/decrypt this packet using session number xx'. Preferably, the driver software 913 defines the meaning of a particular Tag. Default Rule 1106 and its associated Action define what happens when no Filtering Rule 1104 in a single Rule Table 908 is true. In other words, it is the specified action to be taken when a protocol element fails all of the Filtering Rules 1104 in a Rule Table 908 or when there are no Filtering Rules 1104. Thus, for example, the Protocol Element Locator 1102 of the first Rule Table 908A may select the Type field in an Ethernet frame (bytes 12 and 13). The second Filtering Rule 1104 in Rule Table 908A may test for equality with 0x0800 (IP). The Protocol Element Locator 1102 of the second Rule Table 908B may select the destination address field in an IP header (bytes 30–33). The first Filtering Rule 1104 in Rule Table 908B may test for equality with the host processor address. The structure of Filtering Rule 1104 and Default Rule 1106 is described below in more detail with reference to FIGS. 13A and 13B. In a preferred embodiment, the Filtering Rules in a Rule Table 908 are organized as a binary tree sorted by their Lower Bound and Upper Bound fields. One skilled in the art will realize that multiple other data structures, such as sorted lists and arrays, are also possible for implementing Rule Table 908, and that the present invention is not limited to a single data structure for Rule Table 908.

The layered tables of rules in Filtering Database 902 may be prepared ahead of time with a set of static values for representing the protocol element data. Initialization of the Filtering Database 902 is best understood by examining a specific example. For this purpose, the initialization of a Filtering Database 902 for a simplified IP firewall will be described. When the Packet Filtering Engine is first powered on, or reset by either a software command or external signal, the filtering RAM allocation is undefined and all filtering operations are disabled. The first action the host processor takes is to initialize the size registers that determine the size of the Filtering Database 902, Timer Event Queue 904, and Processor Event Queue(s) 906. The next action the host processor takes is to insert a table that tests the MAC header type field. The insert table function also creates a Default Rule 1106 for this table. At this point, filtering actions are possible. Any filtering operation will return the tag for the Default Rule 1106 created in the prior insert table operation. A firewall would typically continue to add rules and tables describing the IP addresses configured in the user database maintained by the host processor software. The dynamic nature of the Filtering Database 902 is a very important feature of this invention. It can be used as follows:

After the MAC header rule and others to select IP, TCP, and FTP, it is then possible to add a rule that detects FTP open operations to a protected server to the Filtering Database 902. This would require a separate rule table by IP address. When FTP open is detected, the packet can be passed to a process (possibly on the host processor) for authentication. If the authentication is successful a new rule for the authenticated session can be added to the Filtering Database 902. From this point, the host processor never examines the contents of the FTP packets. The filtering database entry for this session should be removed when an FTP close is detected. The timers can be used to control this FTP session length. Also, the statistics counters can be used for packet count during the FTP session. One skilled in the art will realize that other methods for initializing the Filtering Database 902 are possible, and that this example is for illustrative purposes only.

Figure 12A:
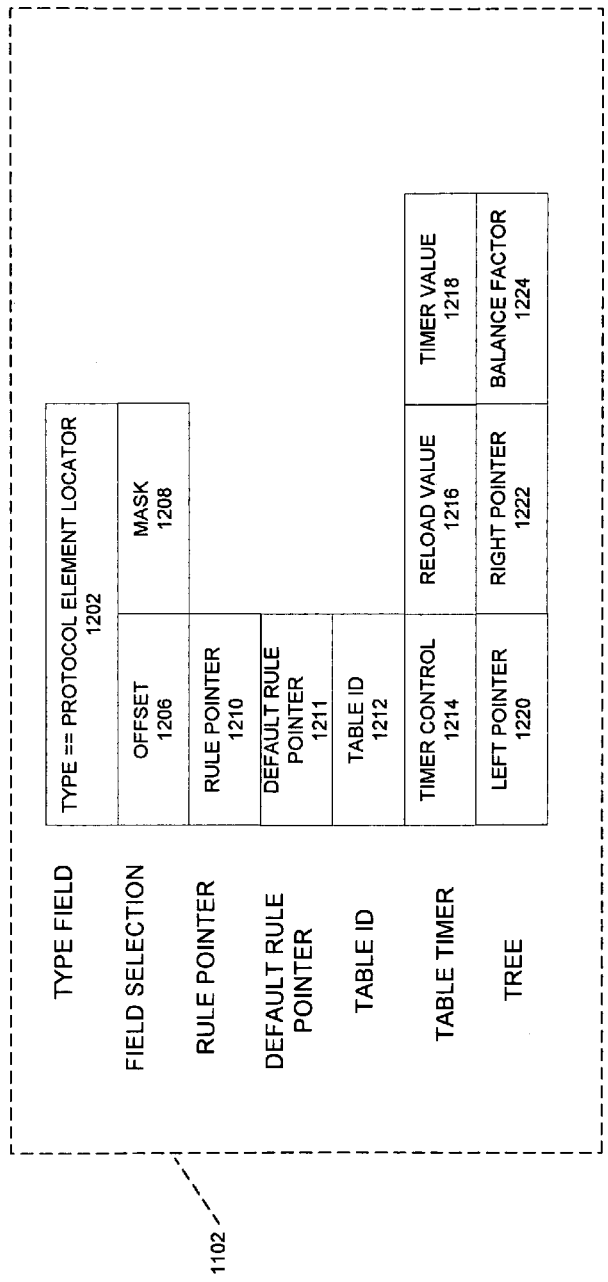
FIGS. 12A and 12B show block diagrams of preferred embodiments of a protocol element locator and the application of a protocol element to a packet to extract a protocol element respectively.
Figure 12B:
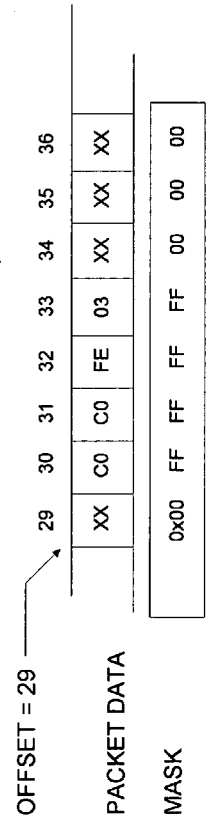

Referring now to FIG. 12A, a block diagram of a preferred structure for a Protocol Element Locator 1102 is shown. Protocol Element Locator 1102 comprises several fields including a type field 1202 to indicate the type of data structure as a Protocol Element Locator 1204, and a field selection field comprising an Offset 1206 and a Mask 1208. The Protocol Element Locator also comprises a Rule Pointer 1210 for pointing to a particular Filtering Rule 1104, a Default Rule Pointer 1211 for pointing to a particular Default Rule 1106, a Table ID 1212, a Table Timer field 1214, 1216, and 1218, and a Tree field comprising Left Pointer 1220, Right Pointer 1222, and Balance Factor 1224. Table ID 1212 and Tree fields (Left Pointer 1220, Right Pointer 1222, and Balance Factor 1224) are used to increase the processing speed of table timers. Left Pointer 1220, Right Pointer 1222, and Balance Factor 1224 are used in the well known AVL tree algorithm to organize the Rule Tables 908 in a binary tree sorted by Table ID 1212. A protocol element in a packet is specified by a starting reference location indicated by the Offset 1206, and the remaining portion of the packet which is not part of the protocol element is masked off with the Mask 1208 from Protocol Element Locator 1102. Referring now to FIG. 12B, a preferred embodiment for selecting the protocol element using Offset 1206 and Mask 1208 is shown. Preferably, the starting octet in a packet indicated by Offset 1206 and a 64 bit Mask 1208 specifies the protocol element, or field of the packet. In a preferred embodiment, packet data is typically processed in 64 bit blocks. The portion of the 64 bits that is not part of the field to be tested is masked off with Mask 1208 from Protocol Element Locator 1102. One skilled in the art will realize that this bit field oriented data description allows the packet filtering system to be described in terms of protocol elements such as IP addresses, IP port numbers, and IPX network numbers. Thus, Protocol Element Locator 1102 allows only the protocol element of the packet to be operated upon. Moreover, it allows a packet to be processed according to protocol elements, which are defined by the operator.

In a preferred embodiment, each Rule Table 908 may also have an associated table timer. Table timer comprises a Timer Control 1214, a Reload Value 1216, and a Timer Value 1218. Preferably, the table timer fields are part of Protocol Element Locator 1102 as shown in FIG. 12. Timer Control 1214 is used to enable or disable timer processing for Rule Table 908. An external clock input is used to run the table timer process. The external clock is divided by a value stored in an internal register to provide a table tick. All of the table timers are processed on each table tick. The table timers determine how frequently filtering rule timers are to be processed. When a Timer Value 1218 expires, i.e. when it decrements to zero or some other specified value, Timer Value 1218 will be reloaded from Reload Value 1216. Table ID 1212 is then placed in the Timer Event Queue 904 for the associated filtering rule timer to be processed individually.

Referring now to FIGS. 13A and 13B, block diagrams of preferred structures of a Filtering Rule 1104 and a Default Rule 1106, respectively, are shown. Filtering Rule 1104 preferably comprises a type field 1302 to indicate the type of data structure as a filtering rule, and a range test field comprising a Lower Bound 1306 and an Upper Bound 1308. Filtering Rule 1104 also comprises a Rule Tree field comprising a Left Pointer 1310, a Right Pointer 1312, and a Balance Factor 1314, an Action field comprising an Instruction 1316 and a User Data (Tag) 1318, a Rule Timer field and a Statistics field. Left Pointer 1310, Right Pointer 1312, and Balance Factor 1314 are used by the well known AVL Tree algorithm to sort the Filtering Rules 1104 in a Rule Table 908 by Lower Bound 1306 and Upper Bound 1308. Instruction 1316 comprises an instruction to be executed if Filtering Rule 1104 is true or otherwise satisfied. Instruction 1316 may be a pointer to another Rule Table 908 or an instruction to return the User Data (Tag) 1318 to processor 912. Preferably, Protocol Element Locator 1102, Filtering Rule 1104, and Default Rule 1106 are padded to the same size to simplify implementation.

Filtering Rule 1104 specifies a test or comparison to be performed on a protocol element in a packet 916 indicated by Protocol Element Locator 1102. In a preferred embodiment, Filtering Rule 1104 specifies an inclusive range test comprising Lower Bound 1306 and Upper Bound 1308. Thus, a Filtering Rule 1104 is true when the selected protocol element from the packet 916 satisfies the range test. In other words, a Filter Rule is true when:

Lower Bound<=(selected protocol element from packet) <=Upper Bound is true. When Filtering Rule 1104 comprises a Lower Bound 1306 and Upper Bound 1308 with the same value, this is identical to an equality test. Filtering Rule 1104 is not limited to any particular type of test and one skilled in the art will realize that Filtering Rule 1104 may comprise any type of test that may be satisfied by the selected protocol element. For example, a Filtering Rule 1104 for a protocol element may test whether an IP destination address is within a certain range.

Default Rule 1106 specifies an action to be executed on a protocol element in a packet 916 indicated by Protocol Element Locator 1102 when none of Filtering Rules 1104 are satisfied or when there are no Filtering Rules 1104 in Rule Table 908. As shown in FIG. 13B, Default Rule 1106 comprises a type field 1350 to indicate the type of data structure as a default rule, an action field comprising an Instruction 1354 and a User Data (Tag) 1356, a Rule Timer field and a Statistics field. Instruction 1354 comprises an instruction to be executed by processor 912. Instruction 1354 may be a pointer to another Rule Table 908 or an instruction to return the User Data (Tag) 1356 to processor 912.

In a preferred embodiment, Filtering Rule 1104 and Default Rule 1106 may also have associated timers for allowing timer processing. Applications employing a Packet Filtering System 900 may have timers associated with some or all of the entries in Filtering Database 902. For example, bridges use timers to age the entries in their Media Access Control (MAC) address tables. Firewalls also use timers for UDP data flows such as streaming audio and video. Some Secure IP implementations also use session timers to terminate interrupted sessions. Timer processing may occur as a background process to the data classification and filtering process. Preferably, timer processing for Rule tables (table timer processing) takes precedence to timer processing for Filtering Rules (rule timer processing). Preferably, a rule timer comprises a Timer Control 1320,1358, a Reload Value 1322,1360, and a Timer Value 1324, 1362. Timer Value 1324, 1362 keeps track of the value of the timer as it is processed. Timer Control 1320, 1358 determines what action occurs when Timer Value 1324, 1362 is a certain value. If Timer Value 1324, 1362 is non-zero, it is decremented when the timer is processed. When Timer Value 1324, 1362 changes from one to zero, Timer Control 1320, 1358 determines the next action to be executed. Additionally, Timer Control 1320, 1358 may comprise timeout options that may occur when Timer Value 1324, 1362 expires, i.e. decrements to zero or some other specified value. Timer Value 1324, 1362 may be reloaded from Reload Value 1322, 1360, and processor 912 may be notified that this time out has occurred. The individual Filtering Rule 1104 or Default Rule 1106 may be deleted.

In a preferred embodiment, Filtering Rule 1104 and Default Rule 1106 may also comprise statistics processing and threshold testing. Applications employing a Packet Filtering System 900 may collect statistics associated with some or all of the entries in Filtering Database 902. For example, firewalls may count the number of TCP syn frames addressed to each host. Preferably, a statistic comprises a Statistics Control 1326, 1364, a Threshold 1328, 1366, and a Value 1330, 1368. Statistics Control 1326, 1364 determines what action is to be executed when Value 1330, 1368 or Threshold 1328, 1366 reaches a specified value. In a preferred embodiment, statistics have only one Threshold 1328, 1366. Alternatively, separate minimum and maximum thresholds could be added at the cost of some additional memory. Applications of a Packet Filtering Engine 930 may collect statistics associated with some or all of the entries in a Filtering Database 902. Statistics may be associated with an individual Filtering Rule 1104 or Default Rule 1106. Value 1330, 1368 is potentially incremented whenever a Filtering Rule 1104 or Default Rule 1106 is true for a data block being filtered. The increment is controlled by Statistics Control 1326, 1364. It may be set to only increment statistics value 1330, 1368 when it is an end node, i.e. User Data (Tag) is to be returned or one block of data may cause several statistics Value 1330, 1368 to be incremented. Statistics Control 1326, 1364 may be configured inactive for any given Filtering Rule 1104 or Default Rule 1106. Statistics may be sent to processor 912 (a statistics event) on a fixed interval. The statistic would then be reset when this occurs. Processor 912 could also be notified only if Threshold 1328, 1366 is exceeded in the same interval. This feature could be used to detect security problems. Processor 912 could also be notified only if Threshold 1328, 1366 was not met in the same interval. This feature could be used to implement idle traffic timers.

Figure 14A:
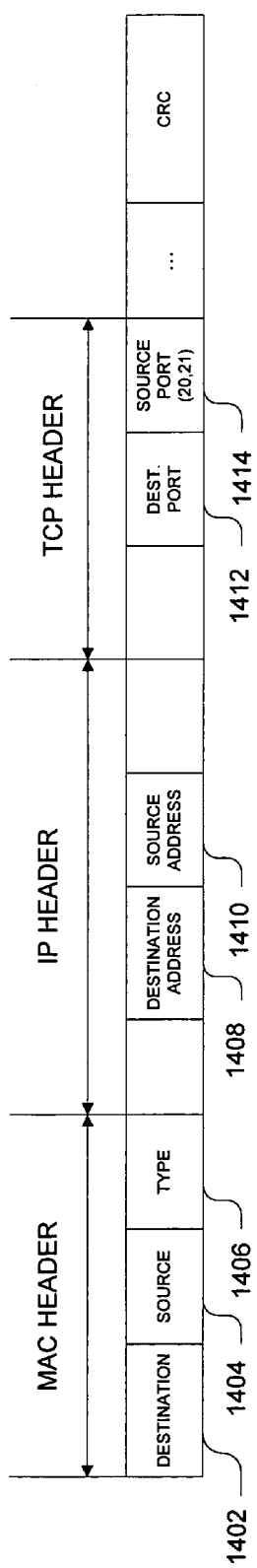
FIGS. 14A and 14B show block diagrams of an example of a packet and of a layered table of rules corresponding to the example packet respectively.
Figure 14B:
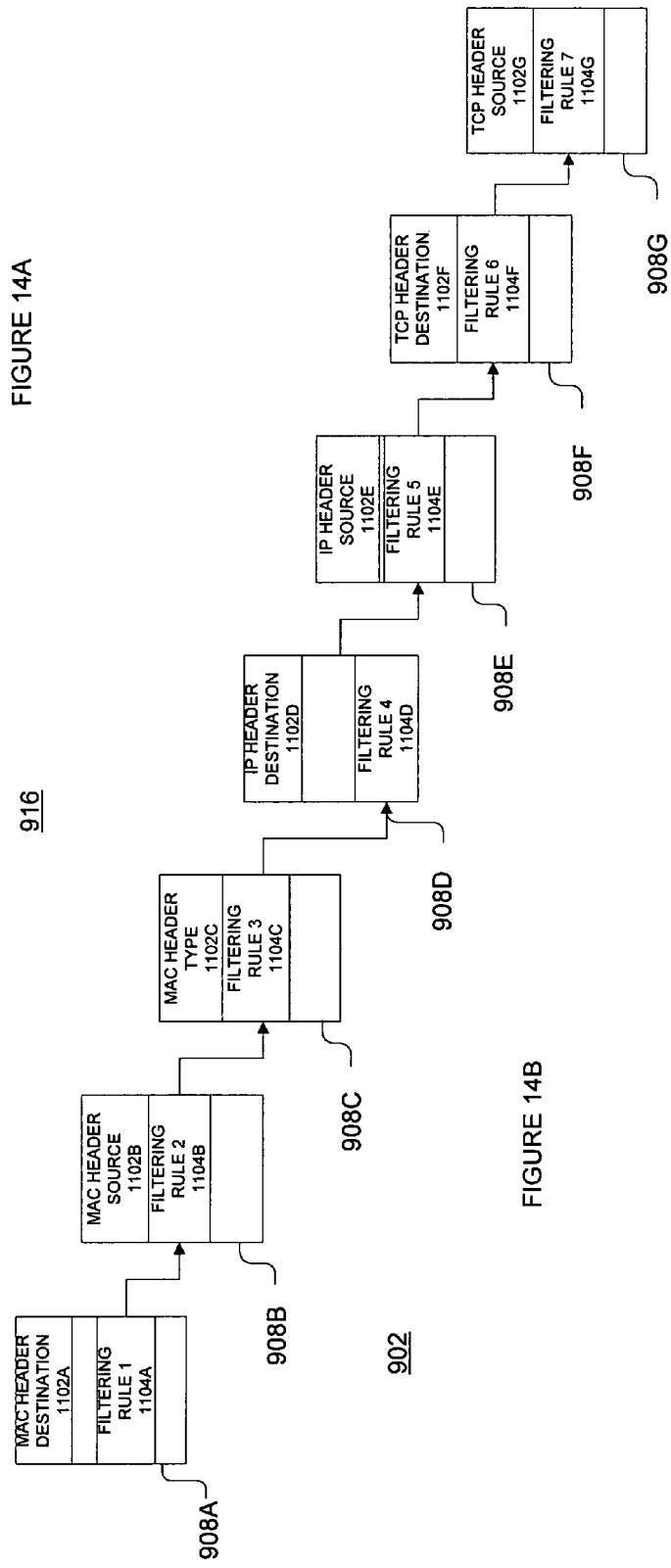

Referring now to FIGS. 14A and 14B, block diagrams of an example format for a packet 916 and an example section of a Filtering Database 902, respectively, is shown to illustrate the operation of a Packet Filtering System 900. In this example, FIG. 14A shows only a portion of an Ethernet frame header. In this example, packet 916 may be received on an Ethernet network (not shown) employing a Packet Filtering System 900 in accordance with the present invention. In this example, each field 1402, 1404, 1406, 1408, 1410, 1412 and 1414, in the header of packet 916 is a protocol element. Each Rule Table 908 corresponds to a single protocol element. For example, Rule Table 908A corresponds to the MAC Header destination field 1402, Rule Table 908B corresponds to the MAC Header source field 1404, and Rule Table 908C corresponds to the MAC Header type field 1406. In this example, each Rule Table 908 comprises at least one Filtering Rule 1104 which has an associated Action comprising a pointer to a new Rule Table 908. As discussed above, an Action associated with a Filtering Rule 1104 may also comprise an instruction to return a Tag to the host system. Each Filtering Rule 1104 in a Rule Table 908 comprises a test for recognizing or identifying the protocol element associated with the Rule Table 908. For example, if the value in MAC Header destination field 1402 is 500, Filtering Rule 1 1104A in Rule Table 908A may comprise a range test to determine whether the MAC Header destination field 1402 is between the range 400 and 600. Because Filtering Rule 1 1104A is true, Filtering Database 902 moves to the next table indicated by the pointer to Rule Table 908B. Rule Table 908B then evaluates the MAC Header Source field 1404 of packet 916 and applies the Filtering Rules 1104 in Rule Table 908B to that particular protocol element. When Filtering Rule 2 1104B is applied and determined to be true, Filtering Database 902 continues to the next table as indicated by the pointer to Rule Table 908C. The following process is repeated until the packet 916 has been classified/filtered and a final action for the packet is executed. Thus, as illustrated above, the present invention allows a packet to be filtered/classified quickly and efficiently. Each Rule Table 908 in Filtering Database 902 operates upon a single protocol element and thus is not limited to evaluating a single byte or octet at a time.

Referring now to FIG. 15, a block diagram of a preferred embodiment of a sequential implementation of a Packet Filtering Engine 930 is shown. A sequential implementation of a Packet Filtering Engine 1500 comprises a Processor Interface 1502, a Packet Data Buffer 1504, a Packet Direct Memory Access (DMA) Engine 1506, Processor Interface Registers 1508, a Rule Evaluator 1510, a Rule Buffer 1512, a Control Sequencer 1514, a Protocol Element Locator Buffer 1516, a Default Rule Buffer 1520, and a Tree and Queue DMA Engine 1518. Processor Interface 1502 couples DMA Engine 1506 and Processor Interface Registers 1508 to Processor 912 via bus 902A. Processor Interface 1502 may be any conventional interface, such as a PCI bus. Packet Data Buffer 1504 stores the portion of the packet 916 to be used by Rule Evaluator 1510. Packet DMA Engine 1506 accesses the packet stored in the host system memory 914 and copies the portion specified by the Protocol Element Locator 1102 to the Packet Data Buffer 1504 for use by Rule Evaluator 1510. Preferably, Packet DMA Engine 1506 is a conventional DMA device such as an Intel 8237 DMA controller or the IDMA function of a Motorola Communications Processor. Processor Interface Registers 1508 allow communication between the processor software and Packet Filtering Engine 930. Processor Interface Registers 1508 are conventional registers and contain information and functions such as interrupts, the size and type of Filtering Memory 928, the configuration of Packet DMA Engine 1506, queues for timer and statistic events, and commands from and responses to the processor 912. Rule Evaluator 1510 applies a Rule Table 908 to the protocol element indicated by Protocol Element Locator 1102. Preferably, Rule Evaluator 1510 performs a masking operation and range test. Rule Buffer 1512 stores Filtering Rule 1104 used by Rule Evaluator 1510. Control Sequencer 1514 executes commands requested by processor 912 and processes timers as a background task. Control Sequencer 1514 also uses Tree and Queue DMA Engine 1518 to access Filtering Database 928 in response to a command to find a protocol element in accordance with the present invention. Preferably, Control Sequencer 1514 also has an internal register to store a pointer to the Rule Table 908 being processed by the Table Timer Process, and an internal register to store a pointer to the Filtering Rule 1104 currently being processed by the Rule Timer Process. Protocol Element Locator Buffer 1516 stores Protocol Element Locator 1102 used by Rule Evaluator 1510 and Packet DMA Engine 1506. Rule Buffer 1512 stores Filtering Rule(s) 1104, and Default Rule Buffer 1520 stores Default Rule 1106. Tree and Queue DMA Engine 1518 manages Filtering Memory 928 and provides free list management, access to Filtering Database 902, and queue management for Timer Event Queue 904 and Processor Event Queue 906.

Figure 16:
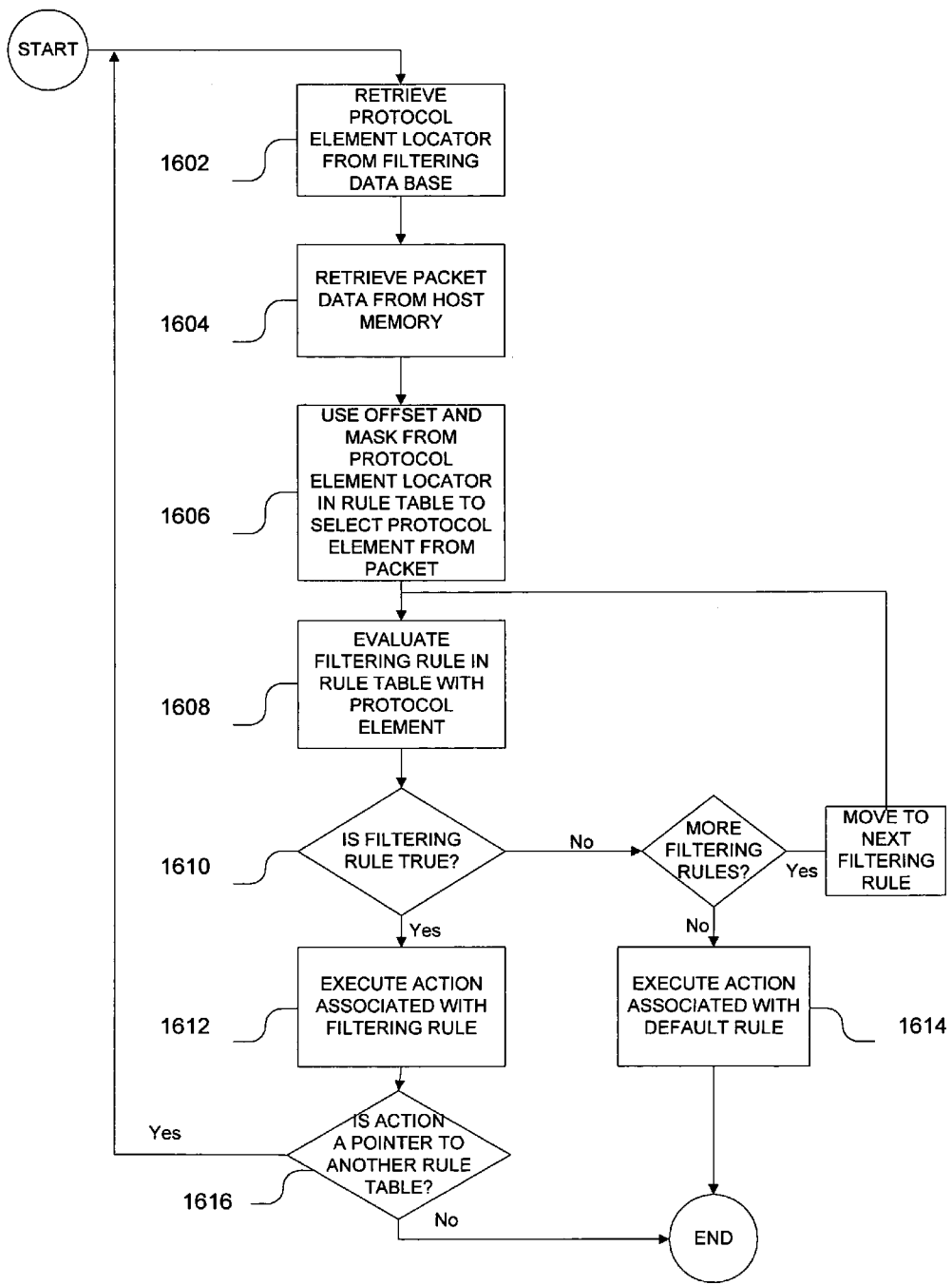
FIG. 16 is a flow chart illustrating the steps of a preferred embodiment of a method for filtering a packet using a sequential packet filtering system.

In operation, packets to be filtered are stored in Host Processor Memory 914. Referring now to FIG. 16, a flow chart illustrating the steps of a preferred embodiment of a method for filtering packets is shown. Tree and Queue DMA Engine accesses (1602) Rule Table 908 which contains Protocol Element Locator. Protocol Element Locator 1102 is stored to Protocol Element Locator Buffer. Packet DMA Engine 1506 then copies (1604) the portion of the packet stored in Host Processor Memory 914 to the Packet Buffer 1504 to be used by Rule Evaluator 1510. Tree and Queue DMA Engine also accesses (1604) Rule Table 908 which contains possible Filtering Rules 1104 and Default Rule 1106 to be used for the Protocol Element being processed. The offset and mask of the Protocol Element Locator are then used (1606) by the Rule Evaluator 1510 to select the Protocol Element from the packet. Rule Evaluator 1510 then evaluates (1608) the Filtering Rule 1104 for the selected protocol element indicated by Protocol Element Locator 1102. In other words, the values in Filtering Rule 1104 are compared with the value in the protocol element as described above with reference to FIGS. 13A, 14A, and 14B. When a Filtering Rule 1104 for the protocol element is determined (1610) to be true, then the Action associated with the true Filtering Rule 1104 is executed (1612). When none of the Filtering Rules 1104 is true or when there are no Filtering Rules 1104, the action associated with Default Rule 1106 is executed (1614). The process illustrated in FIG. 16 is repeated until there are no more Filtering Rules 1104 or until a Filtering Rule is true.

Figure 17:
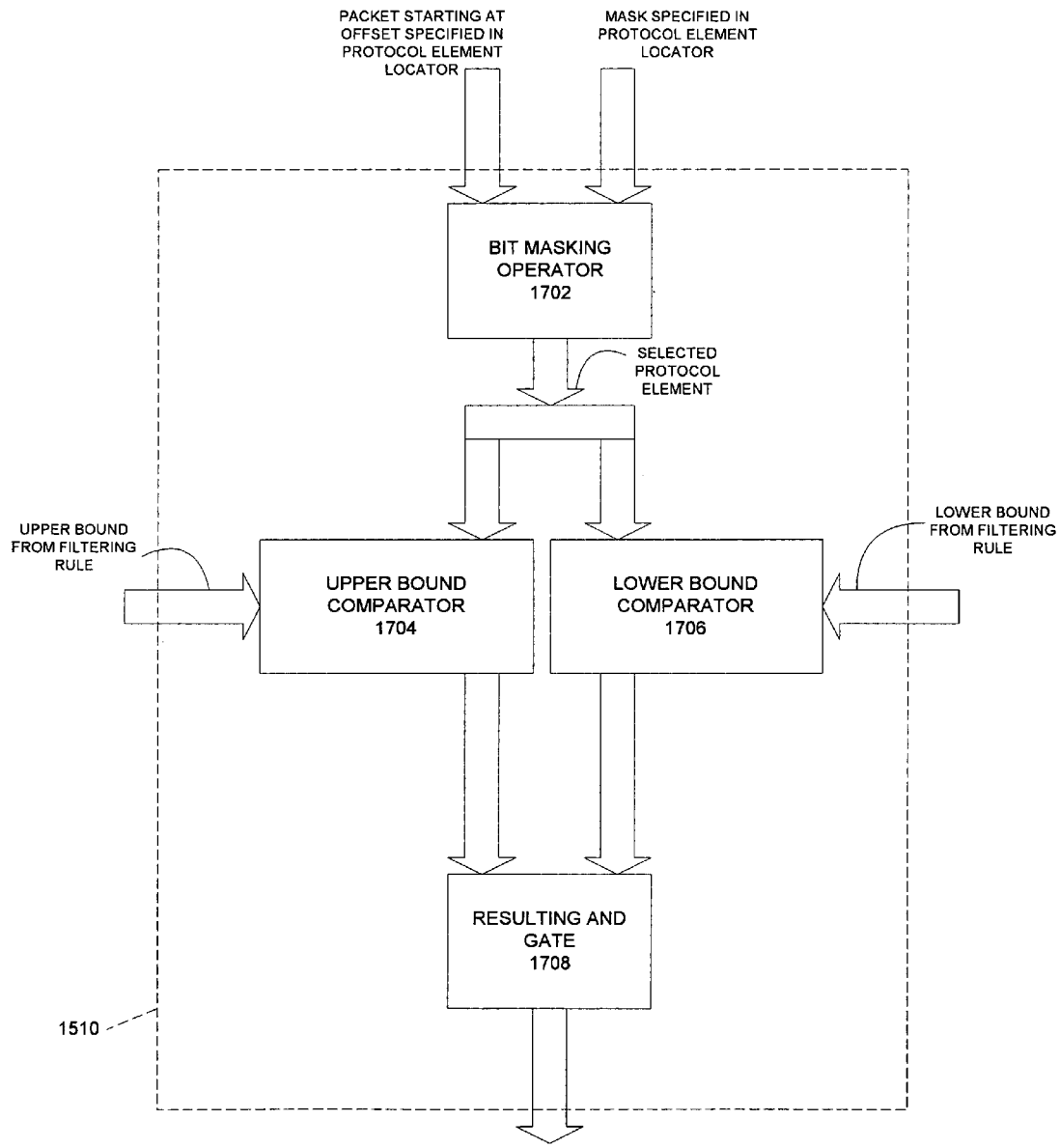
FIG. 17 is a block diagram of a preferred embodiment of a rule evaluator for a sequential packet filtering engine.

Referring now to FIG. 17, a block diagram of a preferred embodiment of Rule Evaluator 1510 for a sequential Packet Filtering System 1500 is shown. Rule Evaluator 1510 comprises a Bit-wise AND gate 1702, an Upper Bound Comparator 1704, a Lower Bound Comparator 1706, and a Resulting AND gate 1708. Bit-wise AND gate 1702 is coupled to receive the packet starting at Offset 1206 and the Mask 1208 specified in Protocol Element Locator 1102. Bit-wise AND gate 1702 asserts the selected protocol element of the packet at its output. Upper Bound Comparator 1704 is coupled to receive the Upper Bound 1308 from Filtering Rule 1104 and the selected protocol element. Lower Bound Comparator 1706 is coupled to receive the Lower Bound 1306 from Filtering Rule 1104 and the selected protocol element. Resulting AND gate 1708 is coupled to receive the outputs from Upper Bound Comparator 1704 and from Lower Bound Comparator 1706 and produces a true or false result at its output. Thus, Rule Evaluator 1510 selects or determines the protocol element from the packet by performing a bit-wise AND on the packet starting at Offset 1206 and the Mask 1208. The selected protocol element from the packet is then compared with the Upper Bound 1308 of a Filtering Rule 1104 and with the Lower Bound 1306 of a Filtering Rule 1104. Preferably, Upper Bound Comparator 1704 determines whether the selected protocol element is equal to or less than the Upper Bound 1308 and Lower Bound Comparator 1706 determines whether the selected protocol element is equal to or greater than the Lower Bound 1306. If the result of both comparators is true, then Resulting AND gate 1708 asserts a "true" or "1" at its output. Otherwise, Resulting AND gate 1708 asserts a "false" or "0" at its output.

Figure 18:
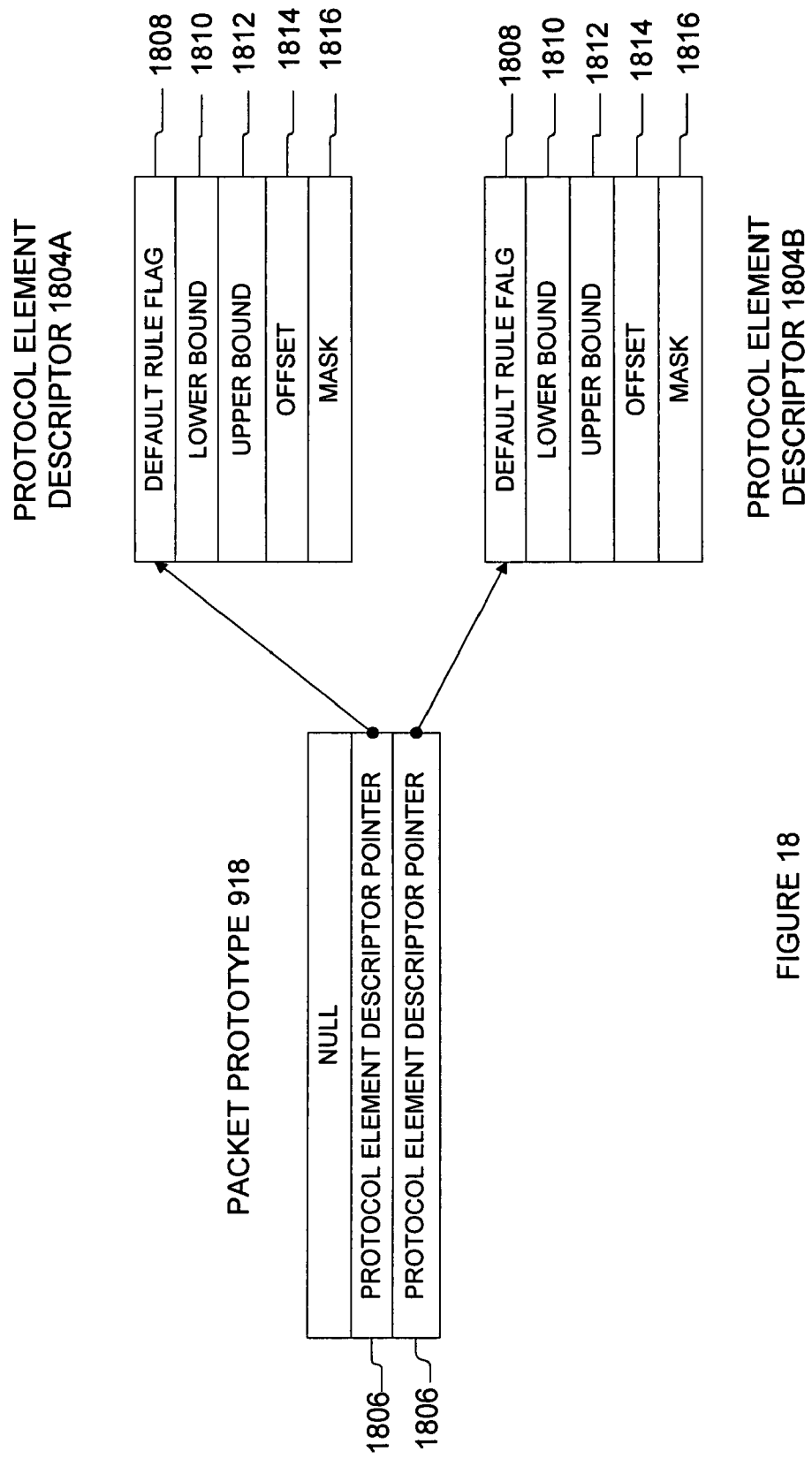
FIG. 18 is a block diagram of a preferred embodiment of structures for a packet prototype and protocol element descriptors.

Filtering Database 902 is accessed using commands issued by the driver software 913 of host system 901. The commands are transmitted to the Packet Filtering Engine 930 via the Host Processor Interface Registers 1508. The commands issued by the driver software 913 to access Filtering Database 902 preferably comprise an insert table, delete table, insert rule and delete rule commands. One skilled in the art will realize that access to Filtering Database 902 is not limited to these commands but may include other commands for creating or modifying Filtering Database 902. In order to identify the Rule Table 908 or Filtering Rule 1104 in Filtering Database 902 to which a command applies, a Packet Prototype 918 is used. A Packet Prototype 918 is an interface data structure that provides a method of finding the correct location in Filtering Database 902 to add a new entry, such as a new Rule Table 908, a Protocol Element Locator 1102, a Filtering Rule 1104, or a Default Rule 1106, or to find the location of an existing entry in the Filtering Database 902. In other words, a Packet Prototype 918 uniquely identifies a node, i.e. a Rule Table 908, a Filtering Rule 1104, or a Default Rule 1106 in Filtering Database 902. Referring now to FIG. 18, preferred embodiments of structures for a Packet Prototype 918 and a Protocol Element Descriptor 1804 are shown. Packet Prototype 918 comprises a null terminated list of pointers 1806 to Protocol Element Descriptors 1804. Protocol Element Descriptor 1804 comprises a Default Rule Flag 1808, a Lower Bound 1810, an Upper Bound 1812, an Offset 1814, and a Mask 1816. Protocol Element Descriptor 1804 defines a unique node in the Filtering Database. For example, one Protocol Element Descriptor 1804A may define the database entry associated with a TCP Source Port as Telnet (setting both bounds to 23) while another Protocol Element Descriptor 1804B may define the database entry associated with a TCP Destination Port as FTP (setting bounds to 20 and 21 for FTP data and FTP control respectively). Different Packet Prototypes 918 may contain the same Protocol Element Descriptors 1804. For example, a Packet Prototype to define the database entry associated with an FTP flow from host Alpine to Kirkwood and a Packet Prototype 918 to define the database entry associated with the reverse FTP flow would contain the same Protocol Element Descriptors 1804. Offset 1814 and Mask 1816 in Protocol Element Descriptor 1804 are used for error checking the Packet Prototype 918 and are optional fields.

In order to initialize Filtering Database 902, an initialize Filtering Database command is issued by Driver Software 913 to Packet Filtering Engine 930. After the initialize command has been executed, the Filtering Database 902 is empty, i.e. the root pointer of Filtering Database 902 is null. Preferably, the first action performed by Driver Software 913 is an Insert Table operation. The Insert Table operation creates a root Table Rule 908. The first Insert Table operation creates a root Rule Table 908 in Filtering Database 902. For example, the root Rule Table 908 may be to test the Ethernet type field for IP. The first Protocol Element Descriptor pointer 1804 in the Packet Prototype 918 will be null for this command as illustrated in FIG. 18. After the first root Rule Table 908 has been created, a device, such as an IP router, employing a Packet Filtering System 900 in accordance with the present invention may add a Filtering Rule 1104 to the first Rule Table 908. For example, the device may add a Filtering Rule 1104 with a Lower Bound and Upper Bound of 0x0800. When the device wants to add additional Rule Tables 908 or entries for such Rule Tables to Filtering Database 902, Driver Software 913 issues a command, such as Insert Table or Insert Rule to the Packet Filtering Engine 930. Packet Filtering Engine 930 then uses Packet Prototype 918 to identify the appropriate node in the Filtering Database 902 and inserts the table or rule at the appropriate node.

To insert or delete a Rule Table 908 in Filtering Database 902, a pointer is created and set to point to a structure that comprises a Packet Prototype 918, for locating the Filtering Rule 1104 or Default Rule 1106 to which a new Rule Table 908 is linked, a Protocol Element Locator 1102 for the new Rule Table 908, and a Default Action 1106 for the new Rule Table 908. After the parameters have been set up, an Insert Table or Delete Table command is issued by Driver Software 913 to Packet Filtering Engine 930 and the Rule Table 908 is inserted or deleted.

To insert or delete a Filtering Rule 1104 or Default Rule 1106 in a Rule Table 908 in a Filtering Database 902, a pointer is created and set to point to a structure that comprises an Action for the new rule for an Insert Rule command and a Packet Prototype 918, which is used to locate the Rule Table 908 in which the Filtering Rule 1104 or Default Rule 1102 is inserted or deleted. After the parameters have been set up, the Driver Software 913 issues an Insert Rule or Delete Rule command and the Filtering Rule 1104/Default Rule 1106 is inserted or deleted in Rule Table 908 in Filtering Database 902.

Figure 19:
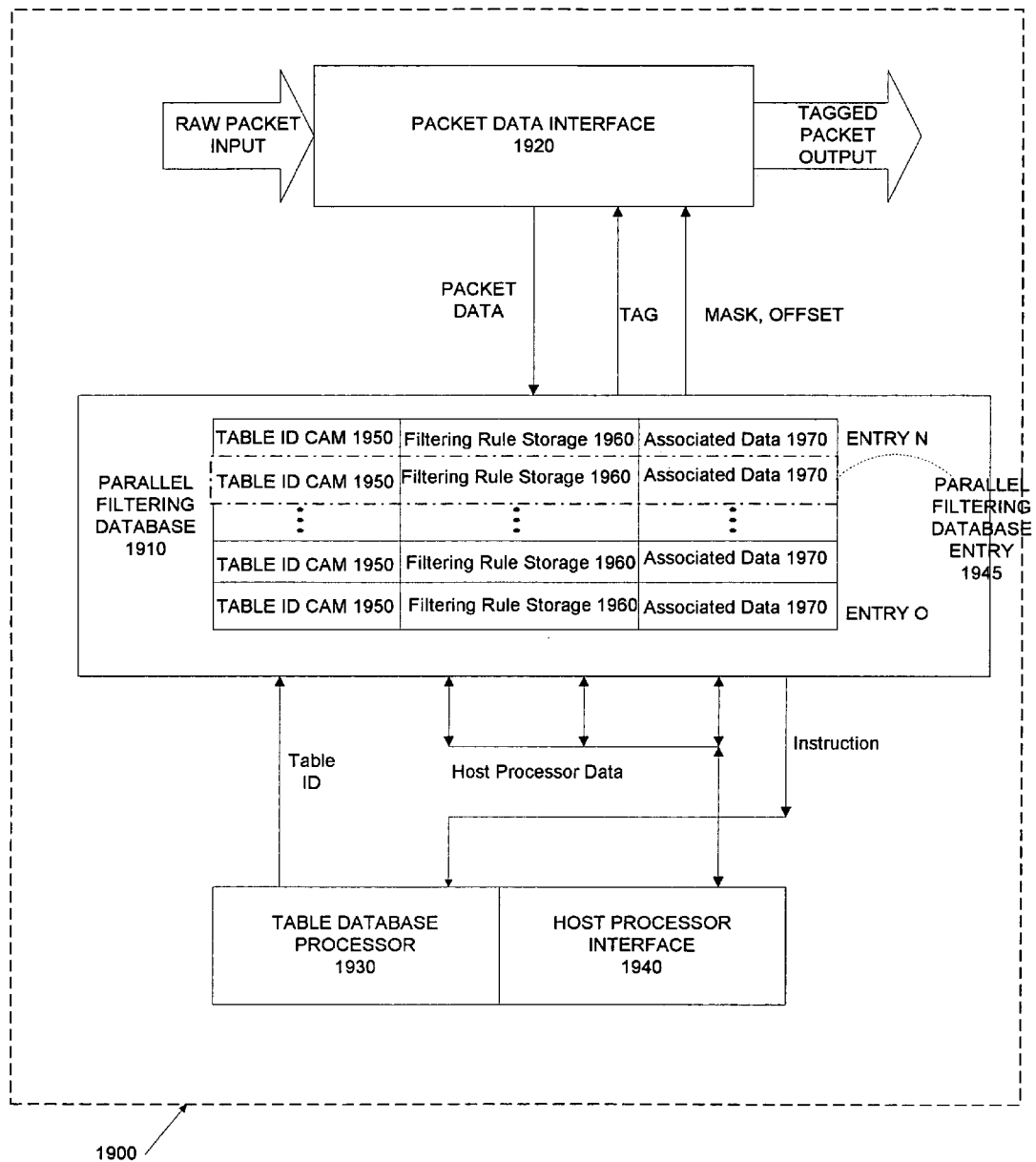
FIG. 19 is a block diagram of a preferred embodiment of a parallel packet filtering system.

Referring now to FIG. 19, a block diagram of an alternate embodiment of a Data or Packet Filtering System is shown. In such embodiment, the Data or Packet Filtering System is implemented as a parallel Packet Filtering System 1900. The remaining description of the parallel Data or Packet Filtering System will be described in terms of a parallel Packet Filtering System 1900. However, one skilled in the art will realize that the parallel implementation of the Packet Filtering System is similarly applicable to a Data Filtering System. Packet Filtering System 1900 is a parallel computing system comprising a Packet Data Interface 1920, parallel Filtering Database 1910, a Table Database processor 1930, and a host processor interface 1940. With the parallel Packet Filtering System 1900, Rule Tables 908, Protocol Element Locator 1102, Filtering Rules 1104 and Default Rules 1106 are implemented in the same manner as described above with reference to FIGS. 11–14 and stored in Parallel Filtering Database 1910. However, with the parallel Packet Filtering System 1900, all of the rules in a single Rule Table 908 (Filtering Rules 1104 and Default Rules 1106) are evaluated in parallel by the Parallel Filtering Database 1910. In other words, parallel Packet Filtering System 1900 is preferably a single instruction multiple data (SIMD) parallel processing implementation of the filtering process. More specifically, rule evaluation is performed by a distributed computing system where the classification rule evaluation is performed in parallel in the Parallel Filtering Database 1910. The parallel Filtering Database 1910 further comprises an array of Parallel Filtering Database Entries 1945. A Parallel Filtering Database entry 1945 comprises a Table ID CAM 1950, a Filtering Rule Storage 1960, and an Associated Data 1970.

As in the sequential implementations of a Data Filtering System and a Packet Filtering System, a parallel packet filtering system 1900 is based on layered Rule Tables 908 where a Rule Table 908 comprises a Protocol Element Locator 1102, Default Rule 1106, and zero or more Filtering Rules 1104. A Parallel Filtering Database Entry 1945 can store either a Protocol Element Locator 1102, a Default Rule 1106, or a Filtering Rule 1106. Individual Parallel Filtering Database Entries 1945 are grouped into tables by a Table ID stored in the Table ID CAM 1950. Table ID CAM 1950 may comprise any device on which a fast table look up may be performed. For example, Table ID CAM 1950 may comprise a content addressable memory, a sorted list, a binary tree, or similar searchable data structures stored in a random access memory (RAM). The CAM function for Table ID also has a valid bit that inhibits the match function for the CAM. The Valid Bit is set to indicate that a Database entry 1945 contains a Filtering Rule 1104, a Protocol Element Locator 1102, or a Default Rule 1106 (what it contains is determined by control bits in the associated data). If the Valid Bit is zero the Parallel Filtering Database entry 1945 is free (unused). Free entries are stored as a linked list. The Link is stored in the Associated Data 1970.

The Filtering Rule Storage 1960 comprises storage for the Lower Bound and Upper Bound values for a filtering rule 1104. The Filtering Rule Storage 1960 also comprises comparators and logic to determine if a Filtering Rule 1104 is true.

The Associated Data 1970 stores the Mask and Offset of the protocol element locator for locating the protocol element in a packet or stores the instruction and tag (user data) for a Filtering Rule 1104. The Associated Data 1970 also has two control bits and a default rule flag that indicates that a database entry contains a default rule. A Protocol Element Locator flag indicates that a Database entry 1945 contains the Protocol Element Locator 1102. The Protocol Element Locator 1102 provides the Offset and Mask for a Rule Table 908. The Table ID specifies to which table a Filtering Rule 1104 belongs.

Figure 20A:
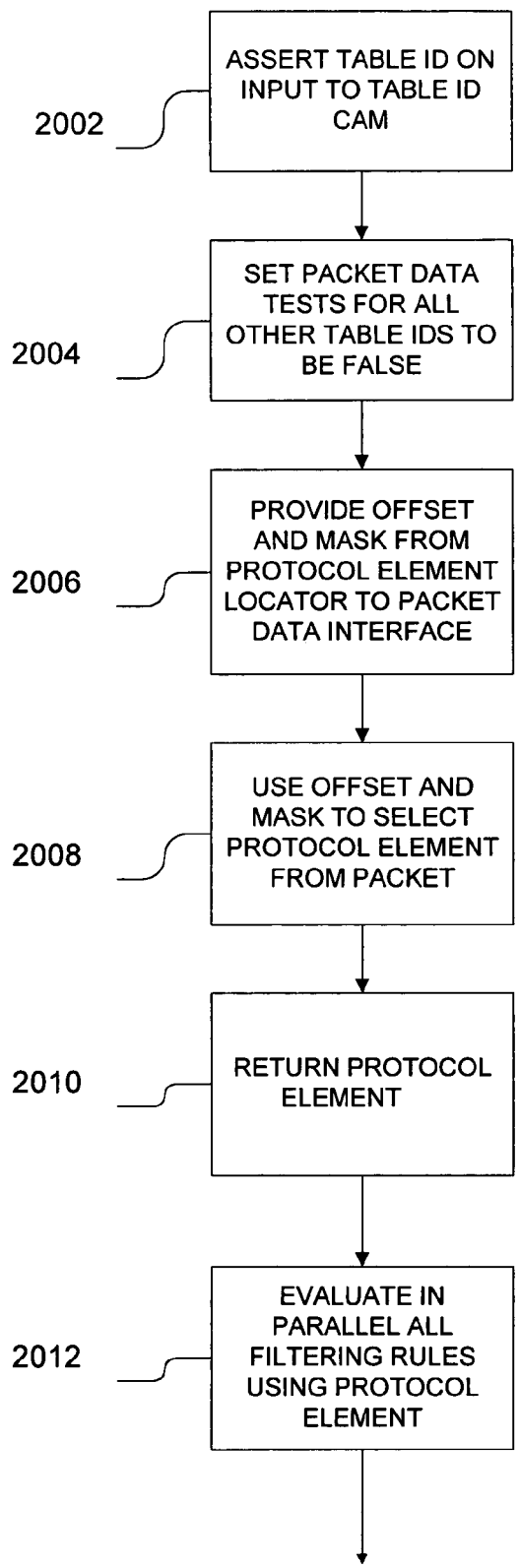
FIGS. 20A and 20B are flow charts illustrating a preferred method for filtering a packet in a parallel packet filtering system.
Figure 20B:
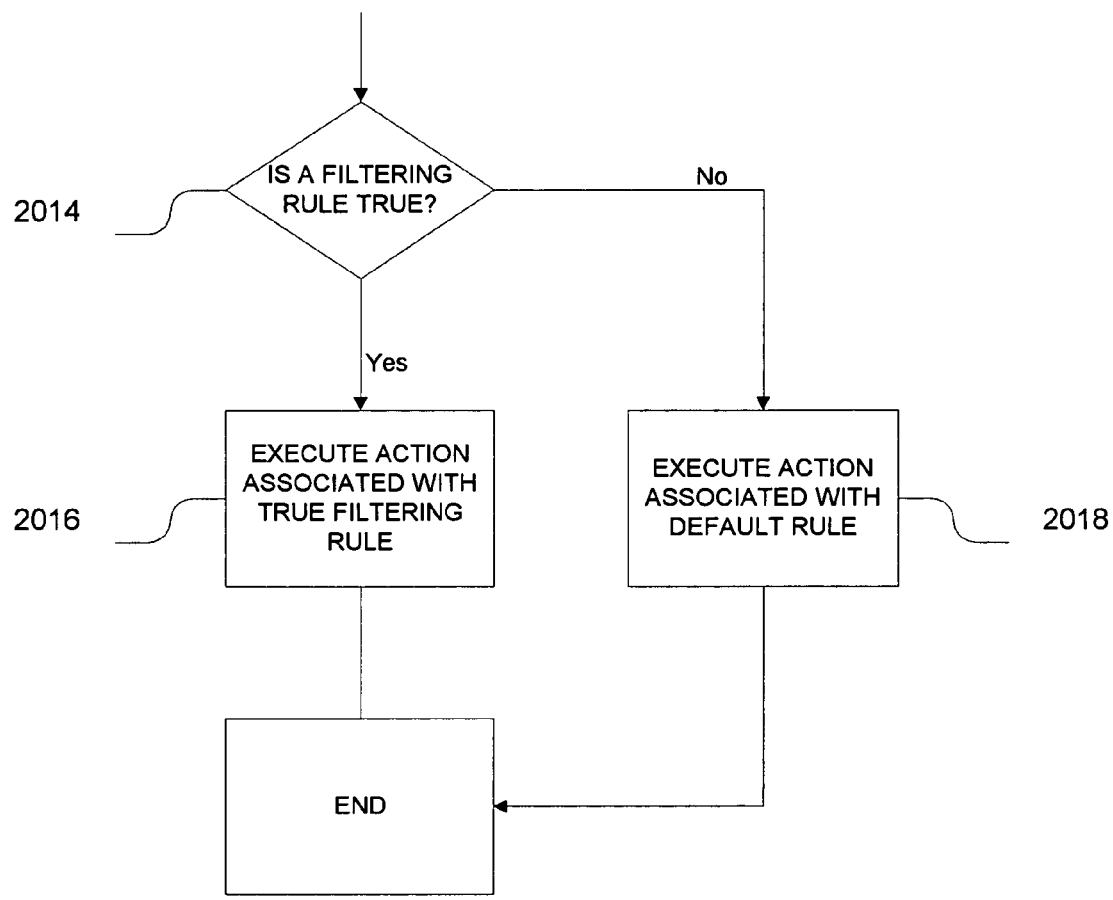

Referring now to FIGS. 20A and 20B, a flow chart of a preferred embodiment of a method for filtering a packet with a parallel Packet Filtering System 1900 is shown. A Rule Table 908 is processed by asserting (2002) the Table ID on the Match Input to the Table ID CAM 1950. When this occurs, the Packet Data Tests for all other Table IDs 1212 will be forced (2004) to be false or "0". The Protocol Element Locator 1102 for this Rule Table 908 provides (2006) the Offset 1206 and Mask 1208 to the Packet Data Interface 1902 to select (2008) the protocol element of the packet 916. Packet Data Interface 1902 then returns (2010) the masked data from the packet, i.e. the selected protocol element, to the packet data test circuits. The Filtering Rules 1104 in Rule Table 908 corresponding to the selected protocol element in packet 916 are then evaluated (2012) in parallel by the packet data test circuits. In this embodiment, only those tests with the correct table ID can be true. If a Filtering Rule 1104 is determined (2014) to be true, the Action associated with the true Filtering Rule 1104 is executed (2016). As discussed above, the associated Action may be to provide to the Table Processor 1930 a Table ID 1212 of the next Rule Table 908 to be processed, to provide a User Data (Tag) to the Packet Data Interface 1920 or to provide a command to the Filtering Engine. If none of the Filtering Rules 1104 in the Rule Table 908 are evaluated to be true or if there are no Filtering Rules 1104 in the Rule Table 908, the Default Rule 1106 is executed (2018), i.e. the Default Rule 1106 provides the Table Database Processor 1930 with the Table ID 1212 of the next Rule Table 908 to be processed or provides the Packet Data Interface 1920 with a User Data (Tag). The default rule for a Rule Table 908 is enabled by a global "no rule" signal that is the NOR (Not OR) of all of the rule true signals output by the packet data tests.

The parallel Packet Filtering System 1900 advantageously evaluates all of the rules in a Rule Table 908 for a single protocol element in parallel thus increasing the speed and efficiency of the entire system. The performance of a device implementing a parallel Packet Filtering System 1900 is determined by the time required to process one Rule Table 908 and the number of linked Rule Tables 908. Thus, a device operating in accordance with the principles of the parallel Packet Filtering System 1900 may process approximately five to ten million packets per second with up to ten layers of Rule Tables 908. Another advantage of the parallel Packet Filtering System 1900 is that it can be applied in an on-the-fly filtering or switching system in which packets are classified as data "fly bys" as part of the data transfer of a communications device. Additionally, as with the sequential Packet Filtering Engine 930, optional statistics gathering and timer processing may be provided to minimize system processor load.

It is to be understood that the specific mechanisms and techniques which have been described are merely illustrative of one application of the principals of the invention. Numerous modifications may be made to the methods and apparatus described without departing from the true spirit and scope of the invention.

What is claimed is:

1. A system for filtering packets comprising:
   a filtering database comprising layered rule tables, wherein each rule table applies to a respective protocol element of a packet and comprises a protocol element locator and a default rule; and
   a packet filtering engine coupled to the filtering database for filtering said packets using at least one rule table in the filtering database.

2. The system for filtering packets in claim 1 wherein each rule table further comprises at least one filtering rule.

3. The system for filtering packets in claim 2 wherein the at least one filtering rule comprises a statistics counter.

4. The system for filtering packets in claim 1 wherein the protocol element locator comprises an offset and a mask for selecting a protocol element of a packet.

5. The system for filtering packets in claim 1 wherein the protocol element locator further comprises a table timer and statistics counters.

6. The system for filtering packets in claim 1 wherein the packet filtering engine further comprises:
   a packet buffer for storing packets;
   a protocol element locator buffer for storing the protocol element locator; and
   a rule evaluator for receiving a packet from the packet buffer and applying at least one rule table to the packet.

7. The system of claim 1 wherein the packet filtering engine is coupled to receive a packet prototype modifying the filtering database.

8. The system for filtering packets in claim 1 wherein the system is coupled to receive a packet prototype for determining a part of the filtering database to be modified.

9. A system for filtering packets comprising:
   a packet buffer for storing packets;
   a protocol element locator for indicating a protocol element in a packet;
   a filtering database comprising layered tables of rules, each rule table applying to a respective protocol element of a packet and comprising the protocol element locator, a default rule and zero or more additional filtering rules to be applied to the protocol element in the packet; and
   a rule evaluator having a first input coupled to the packet buffer for using the protocol element locator to determine a protocol element from the packet and for applying at least one rule table to the protocol element.

10. The system for filtering packets in claim 9 wherein each rule table comprises at least one filtering rule and at least one default rule to be applied to the protocol element indicated by the protocol element locator.

11. The system for filtering packets in claim 9 further comprising a processor interface for receiving a packet prototype, said packet prototype to be used in modifying the filtering database.

12. A method for filtering packets in a system comprising a filtering database containing layered tables of rule tables, the method comprising the steps of:
   selecting a protocol element from a packet;
   accessing a unique rule table in said layered tables of rule tables corresponding to the selected protocol element; said rule table comprising a default rule, zero or more additional filtering rules, and a protocol element locator; and
   applying the default rule and zero or more additional filtering rules and the protocol element locator of the unique rule table to the selected protocol element.

13. The method of claim 12 wherein the step of selecting a protocol element further comprises the substeps of:
   obtaining a protocol element locator from the rule table in the filtering database; and
   applying the protocol element locator to the packet to select the protocol element from the packet.

14. The method of claim 12 wherein the step of applying the default rule and zero or more additional filtering rules comprises the substep of:
   determining whether the selected protocol element is less than or equal to an upper bound.

15. The method of claim 12 wherein the step of applying the default rule and zero or more additional filtering rules comprises the substep of:
- determining whether the selected protocol element is greater than or equal to a lower bound.

16. The method of claim 12 further comprising the step of receiving a packet prototype for modifying the filtering database.

17. A system for modifying a filtering database comprising:
- a packet prototype for determining a location to be modified in the filtering database, the packet prototype comprising at least one protocol element descriptor having a default rule flag pointing to a default rule, an upper bound and a lower bound, wherein said lower bound and said upper bound are used to point to a location in the filtering database, and
- a filtering engine for receiving the packet prototype from an external software source and for modifying the location determined by the packet prototype.

18. An apparatus for filtering packets comprising:
- a plurality of protocol element locators, each protocol element locator having an offset and a mask for selecting one of a plurality of protocol elements from a packet;
- a plurality of rule tables, each rule table corresponding to a respective protocol element; and
- a rules database implemented in a storage medium having a default rule and a filtering action for each rule table.

19. The apparatus of claim 18 wherein each rule table further comprises at least one filtering rule.

20. The apparatus of claim 19 wherein the filtering rule comprises a pointer to another rule table.

21. The apparatus of claim 19 wherein the filtering rule comprises a statistics counter.

22. The apparatus of claim 18 wherein the protocol element locator specifies an offset and a mask for selecting a protocol element from a packet.

23. A system for filtering packets comprising:
- a static storage device;
- a filtering database comprising a protocol element locator for selecting one of a plurality of protocol elements from a packet, a plurality of rule tables, wherein each rule table has a corresponding protocol element and a default rule; and
- a packet filtering engine coupled to the filtering database, the filtering engine to filter packets using the rule table.

24. The system of claim 23 wherein the filtering database further comprises at least one filtering rule for each rule table.

25. The system of claim 23 wherein the filtering rule comprises a pointer to another rule table.

26. The system of claim 24 wherein the filtering rule comprises a statistics counter.

27. The system of claim 23 wherein the protocol element locator comprises an offset and a mask for selecting the protocol element of the packet.

28. The system of claim 23 wherein the protocol element locator further comprises a table timer and statistics counters.

29. The system of claim 23 wherein the filtering engine further comprises:
- a packet buffer for storing packets;
- a protocol element locator buffer for storing the protocol element locator; and
- a rule evaluator for receiving the packet from the packet buffer and applying at least rule table to the packet.

* * * * *